United States Patent [19]

Kühlthau et al.

[11] 4,051,117
[45] Sept. 27, 1977

[54] TRIAZOLE-AZO-PHENYL CATIONIC DYESTUFFS

[75] Inventors: Hans-Peter Kühlthau, Leverkusen; Hermann Beecken, Bergisch-Gladbach, both of Germany

[73] Assignee: Bayer Aktiengesellschaft, Leverkusen, Germany

[21] Appl. No.: 520,211

[22] Filed: Nov. 1, 1974

[30] Foreign Application Priority Data

Nov. 3, 1973 Germany .............................. 2355076

[51] Int. Cl.² ................... C09B 29/08; C09B 29/26; D06P 1/08; D06P 1/10
[52] U.S. Cl. ................ 260/146 R; 260/156; 260/157; 260/308 R; 260/463
[58] Field of Search ........................................ 260/157

[56] References Cited

U.S. PATENT DOCUMENTS

| | | | |
|---|---|---|---|
| 3,007,915 | 11/1961 | Merian | 260/158 |
| 3,336,285 | 8/1967 | Towne et al. | 260/155 |
| 3,438,963 | 4/1969 | Robbins | 260/157 |
| 3,478,011 | 11/1969 | Artz | 260/205 |
| 3,592,807 | 7/1971 | Brachel et al. | 260/207.1 |
| 3,679,656 | 7/1972 | Iizuka et al. | 260/157 |
| 3,709,872 | 1/1973 | Koller | 260/207.1 |
| 3,763,140 | 10/1973 | Entschel et al. | 260/158 |
| 3,821,194 | 6/1974 | Peter et al. | 260/207 |

FOREIGN PATENT DOCUMENTS

| | | | |
|---|---|---|---|
| 229,989 | 11/1963 | Austria | 260/157 |
| 1,501,201 | 10/1967 | France | 260/157 |
| 1,206,179 | 9/1970 | United Kingdom | 260/152 |

*Primary Examiner*—Daniel E. Wyman
*Assistant Examiner*—John J. Doll
*Attorney, Agent, or Firm*—Plumley and Tyner

[57] ABSTRACT

Cationic azodyestuffs of the formula

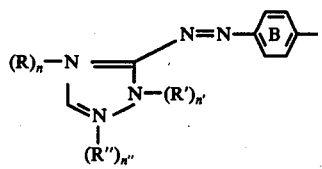
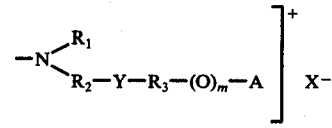

in which the substituents have the meaning stated below, are suitable for dyeing and printing of natural and synthetic materials especially polyacrylonitrile and acid modified polyesters and polyamides.

They are also suitable for dyeing and printing of cellulose acetate, coir, jute, sisal, silk tannin-treated cotton, paper, ball-pen pastes, rubber stamps inks, and for use in flexographic printing.

22 Claims, No Drawings

TRIAZOLE-AZO-PHENYL CATIONIC DYESTUFFS

The invention relates to new cationic dyestuffs of the general formula

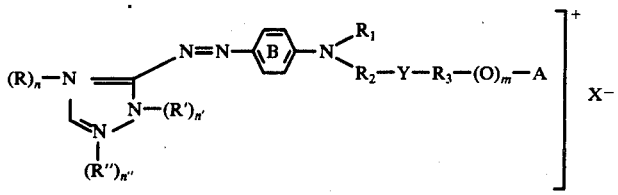

(I)

in which
R, R' and R'' independently of one another denote alkyl, alkenyl, cycloalkyl or aralkyl and
$R_1$ denotes alkyl, alkenyl, cycloalkyl or aralkyl or $R_1$ can be cyclised onto the ring B to form a five-membered or six-membered heterocyclic ring,
$R_2$ denotes an alkylene group,
Y denotes oxygen or sulphur,
$R_3$ denotes a direct bond or an alkylene, —CO— or —CONH— group,
A denotes a saturated or unsaturated carbocyclic six-membered ring or a heterocyclic ring which can contain a quaternary nitrogen atom of the form

and
$X^-$ denotes an anion and
n, n' and n'' independently of one another are 0 or 1 and
m is 0 or 1, with the proviso that the sum $n+n'+n''=2$ and that m is only 1 if $R_3$ represents an alkylene group
and in which
the cyclic and acyclic radicals can contain non-ionic substituents and/or a carboxyl group and optionally non-ionically substituted carbocyclic or heterocyclic rings can be fused onto the rings A and B,
and also processes for the preparation of these cationic dye stuffs and their use for dyeing, printing and bulk dyeing of natural and synthetic materials.

The following may be mentioned as examples of R, R', R'' and $R_1$: as alkyl radicals, above all $C_1$–$C_6$-alkyl radicals, such as the methyl, ethyl, n- and i-propyl and n-, sec.- and t-butyl radical and the n- and i-amyl and n-hexyl radical; further, $C_1$–$C_6$-alkyl radicals which are substituted by the carboxyl group or by non-ionic substituents, such as halogen atoms or hydroxyl, $C_1$–$C_4$-alkoxy, nitrile, $C_1$–$C_4$-alkoxycarbonyl or carbonamide groups, such as the 2-chloroethyl, 2-bromoethyl, 2-hydroxyethyl, 2-methoxyethyl, 2-cyanoethyl, 2-acetoxyethyl, 2-carbonamido-ethyl, 2-carboxyethyl, 2-methoxycarbonylethyl, 2-ethoxycarbonylethyl, 2-hydroxy propyl-(1), 3-cyano-propyl, 2-hydroxy-n-propyl, 2-hydroxy-n-butyl, 2-hydroxy-i-butyl, 2-hydroxy-3-allyloxy-n-propyl and 3-methoxycarbonyl-n-butyl radical; as alkenyl radicals, above all $C_2$–$C_6$-alkenyl radicals, such as the vinyl, allyl, methallyl and 2-chloroallyl radical; as cycloalkyl radicals, above all the cyclopentyl and cyclohexyl radical and their derivatives substituted by non-ionic substituents, such as halogen atoms or $C_1$–$C_6$-alkyl groups, such as the 4-chlorocyclohexyl radical and the dimethylcyclohexyl radical; as aralkyl radicals, above all the benzyl, 2-phenylethyl, β-phenyl-β-hydroxyethyl and 2-phenylpropyl-(2) radical and their derivatives substituted in the phenyl nucleus by non-ionic radicals, such as halogen or $C_1$–$C_4$-alkyl, such as the 4-chlorobenzyl and 3-methylbenzyl radical.

$R_2$ and $R_3$ as alkylene groups can be $C_1$–$C_6$-alkylene groups, especially the methylene, ethylene, propylene-1,3, propylene-(1,2) and butylene-(1,4) group.

For the case of A being a saturated or unsaturated carbocyclic six-membered ring, there should above all be mentioned those of the cyclohexyl, menthyl, borneyl, tetrahydronaphthyl, decahydronapthyl, phenyl and naphthalene series, whilst for the case of A being a heterocyclic ring there should above all be mentioned the 1,2,4-triazolyl-(3), benzthiazolyl-(2) and benzoxazolyl-(2) radical.

Examples of preferred substituents of the ring A are $C_1$–$C_{12}$-alkyl, $C_1$–$C_6$-alkoxy, halogen, $C_1$–$C_4$-alkoxycarbonyl, phenyl, benzyl, 2-phenylethyl, 2-phenylpropyl, $C_1$–$C_4$-alkylsulphonyl or phenylsulphonyl.

As five-membered or six-membered heterocyclic rings which $R_1$ can form by cyclisation onto the ring B, there should above all be mentioned pyrroline and tetrahydropyridine and their derivatives substituted by $C_1$–$C_4$-alkyl radicals, such as 2-methylpyrroline and 2,2,4-trimethyltetrahydropyridine.

Examples of preferred substituents of the ring B are $C_1$–$C_6$-alkyl, $C_1$–$C_6$-alkoxy, phenoxy, benzyloxy, halogen, acetylamino or propionylamino, benzolyamino, methylsulphonylamino, ethylsulphonylamino or phenylsulphonylamino, $C_1$–$C_4$-alkylcarbonyloxy, benzoyloxy, trifluoromethyl or $C_1$–$C_4$-alklsulphonyl.

Non-ionic substituents in the sense of the present invention are the substituents which are customary in dyestuff chemistry and do not dissociate under the reaction conditions in question, such as fluorine, chlorine or bromine; alkyl groups, especially straight-chain or branched alkyl radicals with 1 to 6 C atoms; aralkyl radicals; cycloalkyl radicals; alkenyl radicals; aryl radicals; alkoxy radicals, especially alkoxy radicals with 1 to 4 C atoms; cycloalkyl radicals; aralkoxy radicals; aryloxy radicals; aryloxyalkoxy radicals and alkylthio radicals, preferably alkylthio radicals with 1 to 3 C atoms; aralkylthio radicals; arylthio radicals; nitro; nitrile; alkoxycarbonyl, preferably with an alkoxy radical with 1 to 4 C atoms; aralkoxycarbonyl and aroxycarbonyl; the formyl radical; alkylcarbonyl radicals, especially those with an alkyl group with 1 to 4 C atoms; arylcarbonyl; arylcarbonyloxy; alkylcarbonyloxy; aralkylcarbonyl radicals; alkoxycarbonyloxy radicals, preferably with an alkyl group with 1 to 4 C atoms; alkylcarbonylamino radicals, preferably with an alkyl group with 1 to 4 C atoms, and arylcarbonylamino radicals; arylaminocarbonyloxy radicals and alkylaminocarbonyloxy radicals; alkylsulphonylamino radicals, preferably with an alkyl group with 1 to 3 C atoms; arylsulphonylamino groups, ureido radicals, N-arylureido radicals or N-alkylureido radicals, aryloxycarbonylamino radicals, alkoxycarbonylamino radicals, carbamoyl radicals, n-alkyl-carbamoyl radicals, N,N-dialkylcarbamoyl radicals and N-alkyl-N-arylcarbamoyl radicals; sulphamoyl radicals; N-alkylsulphamoyl radicals; N,N-dialkly-sulphamoyl radicals; alkylsulphonyl radicals; alkenylsulphonyl or aralkylsulphonyl radicals, preferably 1 to 4 C atoms being present in the alkyl radicals mentioned; arylsulphonyl, alkoxysulphonyl and aroxysulphonyl groups. Aryl preferably represents phenyl and naphthyl; aralkyl preferably represents a phenyl or naphthyl radical bonded via a $C_1$–$C_4$-alkylene radical, wherein the aromatic radicals can in particular be substituted by halogen or $C_1$–$C_6$-alkyl radicals.

Possible anionic radicals $X^-$ are the organic and inorganic anions which are customary for cationic dyestuffs.

Examples of inorganic anions are fluoride, chloride, bromide and iodide, perchlorate, hydroxyl, radicals, of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the gylcerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethylbutyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyl-tetraethylene glycolether-propionic acid, 3-(nonyloxy)-propionic acid, 3-(isotridecyloxy)-propionic acid, 3-(isotridecyloxy)-diethylene glycolether-propionic acid, the ether-propionic acid of the alcohol mixture with 6 to 10 carbon atoms, thioacetic acid, 6-benzoylamino-2-chlorocaproic acid, nonylphenol-tetraethylene gylcol-ether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-$\alpha,\alpha'$-dicarboxylic acid, methylene-bis-thioglycollic acid, dimethyl sulphide-$\beta,\beta$-dicarboxylic acid, 2,2'-dithio-di-n-proionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$–$C_{15}$ paraffinsulphonic acids obtained by hydrolysing the sulphochlorination products of the corresponding n-paraffins.

Examples of suitable anions of cycloaliphatic carboxylic acids are the anions of cyclohexanecarboxylic acid and cyclohexane-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercapto-benzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n- dodecylbenzenesulphonic acid, 1,2,3,4-tetrahydronaphthalene- -sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions which do not excessively reduce the solubility of the cationic compounds in water are preferred. The anion is in general decided by the production process and by the purification of the cationic compounds which may be carried out. In general the cationic compounds are in the form of halides (especially chlorides or bromides) or methosulphates, ethosulphates, sulphates, bezenesulphonates or toluenesulphonates, or acetates. These anions can be replaced by other anions in a known manner.

Preferred dyestuffs of the formula I are those which correspond to the general formula

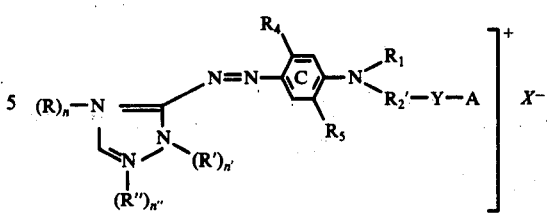

in which
R, R', R'', $R_1$, $R_4$, $R_5$, Y, A, $X^-$, n, n' and n'' have the meaning indicated under the formula II and
$R_2'$ represents the groups

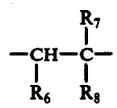

or —$(CH_2)_p$—
in which
$R_6$ denotes hydrogen, methyl, ethyl, methoxymethyl, ethoxymethyl, propoxymethyl, butoxymethyl, allyloxymethyl, phenyl or phenoxymetyl, (II)

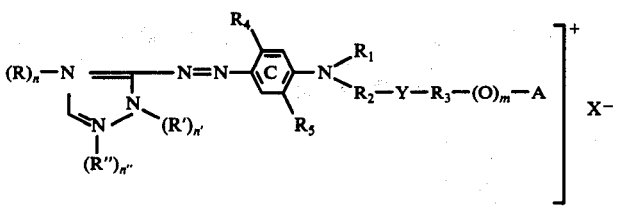

$R_7$ denotes hydrogen, methyl, ethyl, butoxymethyl, methoxymethyl, ethoxymethyl, propoxymethyl, allyloxymethyl, phenyl, phenyloxymethyl or —Y—A,
$R_8$ denotes hydrogen or methyl and
p denotes a number from 1 to 6
and in which
the radicals $R_1$, $R_4$ and $R_5$ and the ring A can optionally have non-ionic substituents and rings which optionally have non-ionic substituents can be fused to the rings A and C.

From the formula III, there should be singled out those dyestuffs in which
R, R' and R'' independently of one another represent methyl, ethyl or benzyl,
$R_5$ represents hydrogen,
$R_4$ represents hydrogen, $C_1$-$C_4$-alkyl, $C_1$-$C_4$-alkyl chlorine or bromine,
$R_2'$ represents —$(CH_2)_p$— and
p represents 2, 3 or 4
the most important dyestuffs being those in which
R, R' and R'' represent methyl,
$R_4$ represents hydrogen, methoxy, chlorine or methyl,
p represents 2,
Y represents oxygen and
A represents cyclohexyl or an optionally substituted phenyl or naphthyl radical.

in which
R, R' R'', $R_1$, $R_2$, $R_3$, Y, A, $X^-$, n, n', n'' and m have the meaning indicated under the formula 1 and
$R_4$ represents hydrogen, halogen, alkyl, alkoxy, aralkoxy, nitrile, aryloxy, acylamino, acyloxy or trifluoromethyl and
$R_5$ represents hydrogen, alkyl, alkoxy, aryloxy, aralkoxy, aralkyl, acylamino or acyloxy
and in which
the radicals $R_1$ to $R_5$ and the ring A can have non-ionic substituents and rings which optionally have non-ionic substituents can be fused to the rings A and C.

Preferred acyl radicals are $C_1$-$C_4$-alkylcarbonyl or -sulphonyl and phenylcarbonyl or -sulphonyl.

Amongst the dyestuffs of the formula II, the dyestuffs of the formulae III, IV, V and VI indicated below are of particular importance:

A. Dyestuffs of the formula III

B. Dyestuffs of the formula IV

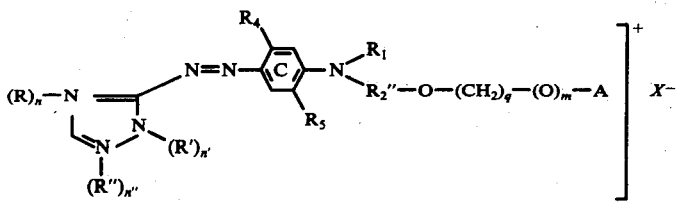

in which
R, R′, R″, R$_1$, R$_4$, R$_5$, A, X−, n, n′, n″ and m have the meaning indicated under the formula II and q represents a number from 1 to 4 and R$_2$″ represents the groups $$-CH-\underset{R_6}{\overset{R_9}{\underset{|}{C}}}-\underset{R_8}{}$$

or —(CH$_2$)$_p$—
in which
R$_6$, R$_8$ and p have the meaning indicated under the formula III and
R$_9$ represents hydrogen, methyl, ethyl, methoxymethyl, ethoxymethyl, propoxymethyl, butoxymethyl, allyloxymethyl, phenyl, phenoxymethyl or —O—(CH$_2$)$_1$—(O)$_m$—A
and in which
the radicals R$_1$, R$_4$ and R$_5$ and the ring A can have non-ionic substituents and rings which optionally have non-ionic substituents can be fused to the rings A and C.

From the formula IV, there should be singled out those dyestuffs in which
R, R′ and R″ independently of one another represent methyl, ethyl or benzyl.
R$_5$ represents hydrogen,
R$_4$ represents hydrogen, C$_1$-C$_4$-alkyl, C$_1$-C$_4$-alkoxy, chlorine or bromine,
R$_2$″ represents —(CH$_2$)$_p$,
p represents 2, 3 or 4 and
q represents 1, 2 or 3
the most important dyestuffs being those in which
R, R′ and R″ represent methyl,
R$_4$ represents hydrogen, methyoxy, chlorine or methyl, p represents the number 2,
m represents 0 and
A represents a phenyl or naphthyl radial which optionally has non-ionic substituents.
In comparably interesting dyestuffs, m represents 1 and at the same time
q represents 2.

C. Dyestuffs of the formula V:

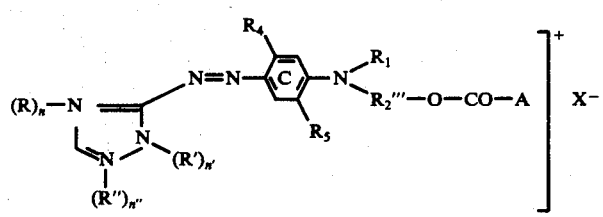

in which
R, R′, R″, R$_1$, R$_4$, R$_5$, A, X−, n, n′ and n″ have the meaning indicated under the formula II and
R$_2$‴ represents the groups $$-CH-\underset{R_6}{\overset{R_{10}}{\underset{|}{C}}}-\underset{R_8}{}$$

or —(CH$_2$)$_p$—
in which
R$_6$, R$_8$ and p have the meaning indicated under the formula III and
R$_{10}$ represents hydrogen, methyl, ethyl, methoxymethyl, ethoxymethyl, propoxymethyl, butoxymethyl, allyloxymethyl, phenyl, phenoxymethyl or chloromethyl
and in which
the radicals R$_1$, R$_4$ and R$_5$ and the ring A can have non-ionic substituents and rings which optionally have non-ionic substituents can be fused to the rings A and C.

Amongst the dyestuffs of the formula V, those to be signled out are the dyestuffs in which
R, R′ and R″ independently of one another represent methyl, ethyl or benzyl,
R$_5$ represents hydrogen,
R$_4$ represents hydrogen, C$_1$-C$_4$-alkyl, C$_1$-C$_4$-alkoxy, chlorine or bromine, and
R$_2$‴ represents —(CH$_2$)$_p$— and
p represents 2, 3 or 4
the most important dyestuffs being those in which
R, R′ and R″ represent methyl,
R$_4$ represents hydrogen, methoxy, chlorine or methyl,
p represents 2 and
A represents a phenyl or naphthyl radical which optionally has non-ionic substituents.

D. Dyestuffs of the formula VI:

$$\left[ (R)_n-N \underset{\underset{(R'')_{n''}}{\overset{N}{\bigvee}}}{\overset{R_4}{\underset{N}{\bigvee}}} N=N-\underset{R_5}{\overset{R_4}{\bigodot}}-N\underset{R_2'''-O-CO-NH-A'}{\overset{R_1}{\diagdown}} \right]^+ X^-$$

in which

R, R', R", R$_1$, R$_2'''$, R$_4$, R$_5$, X-, n, n' and n" have the meaning indicated under the formula V and A' represents a phenyl or naphthyl radical which optionally has non-ionic substituents
and in which
the radicals R$_1$, R$_4$ and R$_5$ can have non-ionic substituents and rings which optionally have non-ionic substituents can be fused to the ring C.

Amongst the dyestuffs of the formula VI, those to be singled out are the dyestuffs in which
R, R' and R" are independently of one another represent methyl, ethyl or benzyl,
R$_5$ represents hydrogen,
R$_4$ represents hydrogen, C$_1$-C$_4$-alkyl, C$_1$-C$_4$-alkoxy, chlorine or bromine,
R$_2'''$ represents —(CH$_2$)$_p$ and
p represents 2, 3 or 4
the most important dyestuffs being those in which
R, R' and R" represent methyl,
R$_4$ represents hydrogen, methoxy, chlorine or methyl and
p represents 2.

The dyestuffs of the formula I are prepared by the action of quaternising agents, which are able to donate, or form, the radicals R, R' and R", on azo compounds of the formula $$\underset{R_{13}}{\overset{N}{\bigvee}}\underset{N}{\overset{}{\bigvee}}\underset{H}{\overset{}{\diagdown}}N=N-\underset{}{\overset{B}{\bigodot}}-N\underset{R_2-Y-R_3-(O)_m-A}{\overset{R_1}{\diagdown}} \quad \text{VII)}$$

in which
R$_1$, R$_2$, R$_3$, A, B, Y and m have the meaning indicated under the formula I and
R$_{13}$ represents hydrogen or the carboxyl group.

In particular, at least 2 mols, and preferably 2 to 2.5 mols, of quaternising agent are employed per mol of azo compound of the formula VII. During the quaternisation, both a substitution of the hydrogen atom bonded to the triazole nitrogen and a quaternisation of a triazole nitrogen takes place. The reaction of the azo compounds of the formula VII with the quaternising agents is carried out in the manner customary for quaterisation reactions. This also gives dyestuffs of the formula I from azo dyestuffs of the formula VII in which R$_{13}$ represents carboxyl, since a spontaneous decarboxylation takes place during the quaternisation, frequently already at the beginning of the reaction.

The quaternising agents to be used can be divided into three groups:

1. Quaternising agents which react with elimination of a radical R, R' or R" and of an anionic radical, for example quaternising agents of the formulae R—X, R'—X and R"—X     (VIII)

in which
R, R' and R" have the meaning indicated under the formula I and
X represents a radical which can be split off as an anion.

These quaternising agents are used at temperatures of 0° to 100° C, preferably 5° to 90° C, optionally in the presence of acid-binding compounds, such as alkaline earth metal oxides, for example magnesium oxide or calcium oxide; alkali metal carbonates and alkaline earth metal carbonates, for example sodium bicarbonate, sodium carbonate, potassium carbonate or calcium carbonate; acetates, for example sodium acetate or potassium acetate, and optionally in diluents which are largely inert under the reaction conditions, such as water or organic solvents, for example hydrocarbons, such as benzene, nitrobenzene, toluene or xylene; halogenohydrocarbons, such as chloroform, carbon tetrachloride, tetrachloroethylene, chlorobenzene or dichlorobenzene; aliphatic ketones, for example acetone or methyl ethyl ketone; and also dimethylformamide, acetonitrile, glacial acetic acid, formic acid and alcohols, for example ethanol, propanol or butanol.

The following may be mentioned as examples of representatives of these quaternising agents: alkyl halides, such as methyl iodide, ethyl bromide, butyl chloride, 2-bromopropionic acid amide, chloroacetic acid ethyl ester, chloroacetic acid amide or 2-bromopropionitrile; alkenyl halides, such as allyl chloride, allyl bromide or methallyl bromide; cycloalkyl halides, such as cyclohexyl bromide; aralkyl halides, such as benzyl chloride or 4-methylbenzyl bromide; alkyl sulphates, such as dimethyl sulphate or diethyl sulphate; and arylsulphonic acid alkyl esters, such as toluenesulphonic acid methyl ester, ethyl ester, n-propyl ester, 2-chloroethyl ester or 2-cyanoethyl ester.

2. Quaternising agents which form the radicals R, R' or R" by addition in the presence of an acid which forms the anion X.

These quaternising agents include, for example, unsaturated compounds, which have an activating group in the position adjoining the double bond, such as acrylic acid and methacrylic acid and their derivatives, for example esters, such as acrylic acid methyl ester and methacrylic acid ethyl ester; amides, such as acrylic acid amide, N-methyl-acrylic acid amide and methacrylic acid amide; or nitriles, such as acrylonitrile and methacrylonitrile.

These unsaturated compounds are reacted with the azo dyestuffs of the formula VII at temperatures of 50 to 100° C in the presence of an organic or inorganic acid which provides the anion X, for example formic acid, acetic acid or hydrochloric acid, optionally in an organic solvent which is inert under the reaction conditions, such as benzene, toluene, xylene, chlorobenzene or dichlorobenzene, nitrobenzene, dioxane, chloroform, dimethylformamide of N-methylpyrrolidone.

The quaternising agents of type (2) further include epoxy compounds such as ethylene oxide and epoxides of the formula

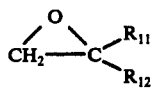 (IX)

in which
R₁₁ represents hydrogen or methyl and
R₁₂ represents methyl, ethyl, chloromethyl, methoxymethyl, ethoxymethyl, propoxymethyl, butoxymethyl, allyloxymethyl, phenoxymethyl or phenyl.

These epoxy compounds are reacted wih the azo compounds of the formula VII, using a solvent, in the presence of an organic or inorganic acid which provides the anion X⁻, at temperatures of 10° to 100° C, preferably at 40° to 90° C. Examples of suitable acids are sulphuric acid, phosphoric acid, hydrochloric acid, hydrogen bromide, benzenesulphonic acid, toluenesulphonic acid, formic acid, acetic acid and propionic acid, and the liquid carboxylic acids can at the same time serve as solvents. Examples of further suitable solvents are dimethylformamide, acetonitrile, dioxane, tetrahydrofuran, halogenobenzenes, benzenehydrocarbons, nitrobenzene, dialkyl ketones and the like.

The compounds of the formula VII are new: they are obtained in a manner which is in itself known by diazotisation of 3-amino-1,2,4-triazole or 3-amino-1,2,4-triazole-5-carboxylic acid and coupling of the diazonium compound with compounds of the formula

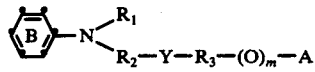 (X)

in which
R₁, R₂, R₃, A, B, Y and m have the meaning indicated under the formula I.

Examples of suitable coupling components of the formula X are: N-β-cyclohexyloxy-ethyl-N-ethylaniline, N-β-benzoyloxy-ethyl-N-ethylaniline, N-β-(p-methoxybenzoyloxy)-ethyl-N-ethylaniline, N-β-(p-methoxy-carbonylbenzoyloxy)-ethyl-N-ethylaniline, N-β-phenoxy-ethyl-N-ethylaniline, N-β-benzyloxy-ethyl-N-ethylaniline, N-β-(β'-phenylethoyloxy)-ethyl-N-ethylaniline, N-β-(γ'-phenylpropyloxy)-ethyl-N-ethylaniline, N-β-(β'-phenyloxyethyloxy)-ethyl-N-ethylaniline, N-β-(p-chlorophenoxy)-ethyl-N-ethylaniline, N-β-(p-chlorobenzlyloxy)-ethyl-N-ethylaniline, N-β-(o-chlorophenoxy)-ethyl-N-ethylaniline, N-β-(p-methylphenoxy)-ethyl-N-ethylaniline, N-β-(o-methylphenoxy)-ethyl-N-ethylaniline, N-β-(p-ethylphenoxy)-ethyl-N-ethylaniline, N-β-(o-ethylphenoxy)-ethyl-N-ethylaniline, N-β-(m-methylphenoxy)-ethyl-N-ethylaniline, N-β-(p-cyclohexylphenoxy)-ethyl-N-ethylaniline, N-β-(β'-naphthoxy)-ethyl-N-ethylaniline, N-β-(o-isopropyloxyphenoxy)-ethyl-N-ethylaniline, N-β-(o,p-dichlorophenoxy)-ethyl-N-ethylaniline, N-β-(p-phenylphenoxy)-ethyl-N-ethylaniline, N-β-(o-benzylphenoxy)-ethyl-N-ethylaniline, N-β-(p-benzylpheonxy)-ethyl-N-ethylaniline, N-β-(p-tert.-butylphenoxy)-ethyl-N-ethylaniline, N-β-phenylthio-ethyl-N-ethylaniline, N-β-(p-methoxyphenoxy)-ethyl-N-ethylaniline, N-β-(o-isopropyl-phenoxy)-ethyl-N-ethylaniline, N-β-(1,2,3,4-tetrahydronaphth-(1)-oxy)-ethyl-N-ethylaniline, N-β-(1,2,3,4-tetrahydronaphth-(1)-oxy)-ethyl-N-ethylaniline, N-β-(phenylaminocarbonyloxy)-ethyl-N-ethylaniline, N-γ-phenoxypropyl-N-ethylaniline, N-δ-phenxoybutyl-N-ethylaniline, N-β-(p-tert.-butylphenylthio)-ethyl-N-ethylaniline, N-β-pentachlorphenylthio-ethyl-N-ethylaniline, N-β-(3,5-dimethylphenxoy)-ethyl-N-ethylaniline, N-β-(3,5-dimethyl-4-chlorophenoxy)-ethyl-N-ethylaniline, N-β-[p-(2-phenylisopropyl)-phenoxy]-ethyl-N-ethylaniline, N-β-(m-chlorophenoxy)-ethyl-N-ethylaniline, N-β-(2,5-dichlorophenoxy)-ethyl-N-ethylaniline, N-β-(2,4,5-trichlorophenoxy)-ethyl-N-ethylaniline, N-β-(2,6-dichlorophenoxy)-ethyl-N-ethylaniline, N-β-(2,4,6-trichlorophenoxy)-ethyl-N-ethylaniline, N-β-(pentachlorophenoxy)-ethyl-N-ethylaniline, N-β-(p-chlorophenylthio)-ethyl-N-ethylaniline, N-β-(2-chloro-6-methylphenxyl)-ethyl-N-ethylaniline, N-β-(2-methyl-5-chlorophenoxy)-ethyl-N-ethylaniline, N-β-(2-methyl-4-chlorophenoxy)-ethyl-N-ethylaniline, N-β-(2-methyl-3-chlorophenoxy)-ethyl-N-ethylaniline, N-β-(2-chloro-5-methylphenoxy)-ethyl-N-ethylaniline, N-β-(3-methyl-4-chlorophenoxy)-ethyl-N-ethylaniline, N-βd-(2,4,6-trichloro-3-methylphenoxy)-ethyl-N-ethylaniline, N-β-(p-methylphenylthio)-ethyl-N-ethylaniline, N-β-(2,3-dimethylphenoxy)-ethyl-N-ethylaniline, N-β-(3,4-dimethylphenoxy)-ethyl-N-ethylaniline, N-β-(2,6-dimethylphenoxy)-ethyl-N-ethylaniline, N-β-(2,4-dimethylphenoxy)-ethyl-N-ethylaniline, N-β-(2,5-dimethylphenoxy)-ethyl-N-ethylaniline, N-β-(3-methyl-5-ethylphenoxy)-ethyl-N-ethylaniline, N-β-(2,3,5-trimethylphenoxy)-ethyl-N-ethylaniline, N-β-(o-sec.-butylphenoxy)-ethyl-N-ethylaniline, N-β -(2-isopropyl-5-methylphenoxy)-ethyl-N-ethylaniline, N-β-(3-methyl-5-isopropylphenoxy)-ethyl-N-ethylaniline, N-β-[p-(1,1,3,3-tetramethylbutyl)-phenoxy]-ethyl-N-ethylaniline, N-β-nonylphenoxyethyl-N-ethylaniline, N-β-dodecylpheonxyethyl-N-ethylaniline, N-β-(2,6-diisopropylphenoxy)-ethyl-N-ethylaniline, N-β-(2-cyclohexylphenoxy)-ethyl-N-ethylaniline, N-β-(α'-naphthoxy)-ethyl-N-ethylaniline, N-β-(o-phenylphenoxy)-ethyl-N-ethylaniline, N-β-(m-phenylphenoxy)-ethyl-N-ethylaniline, N-β-(o-ethoxy-phenoxy)-ethyl-N-ethylaniline, N-β-(m-methoxy-phenoxy)-ethyl-N-ethylaniline, N-β-(p-phenylsulphonyl-phenoxy)-ethyl-N-ethylaniline, N-β-(3-methyl-4-methylthiophenoxy)-ethyl-N-ethylaniline, N-β-(p-methylcyclohexyloxy)-ethyl-N-ethylaniline, N-β-(o-methylcyclohexyloxy)-ethyl-N-ethylaniline, N-β-(m-methylcyclohexyloxy)-ethyl-N-ethylaniline, N-β-(decahydronaphth(2)-oxy)-ethyl-N-ethylaniline, N-β-menthyl-ethyl-N-ethylaniline, N-β-borneyl-ethyl-N-ethylaniline, N-β-(o-chlorobenzyloxy)-ethyl-N-ethylaniline, N-β-(p-methylbenzyloxy)-ethyl-N-ethylaniline, N-β-(p-methoxybenzyloxy)-ethyl-N-ethylaniline, N-β-(o-methylbenzyloxy)-ethyl-N-ethylaniline, N-β-(m-chlorobenzyloxy)-ethyl-N-ethylaniline, N-β-(m-methylbenzyloxy)-ethyl-N-ethylaniline, N-β-(p-chlorobenzoyloxy)-ethyl-N-ethylaniline, N-β-(o-chlorobenzoyloxy)-ethyl-N-ethylaniline, N-β-(chlorobenzoyloxy)-ethyl-N-ethylaniline, N-β-(3,4-dichlorobenzoyloxy)-ethyl-N-ethylaniline, N-β-(2-methylbenzoyloxy)-ethyl-N-ethylaniline, N-β-(p-methoxybenzoyloxy)-ethyl-N-ethylaniline, N-β-(m-chlorobenzoyloxy)-ethyl-N-ethylaniline, N-β-(2,5-dichlorobenzoyloxy)-ethyl-N-ethylaniline, N-β-(2,4-dichlorobenzoyloxy)-ethyl-N-ethylaniline, N-β-(2-bromobenzoyloxy)-ethyl-N-ethylaniline, N-β-(m-methylbenzoyloxy)-ethyl-N-ethylaniline, N-β-(p-tert.- butylbenzoyloxy)-ethyl-N-ethylaniline, N-β-(naphth(2-)oyloxy)-ethyl-N-ethylaniline, N-β-(naphth(1)oyloxy)-ethyl-N-ethylaniline, N-β-(p-phenylbenzoyloxy)-ethyl-N-ethylaniline, N-β-(2-methoxybenzoyloxy)-ethyl-N-ethylaniline, N-β-(3-methoxybenzoyloxy)-ethyl-N-ethylaniline, N-β-(p-methoxycarbonylphenoxy)-ethyl-N-ethylaniline, N-β-(p-ethylthio-o-chlorobenzoyloxy)-ethyl-N-ethylaniline, N-β-(2,6-dichlorobenzoyloxy)-ethyl-N-ethylaniline, N-β-(3,4-dichlorobenzoyloxy)-ethyl-N-ethylaniline, N-β-(1,2,3,4-tetrahydronaphth(6)-oxymethoxy)-ethyl-N-ethylaniline, N-β-(3-chlorophenylaminocarbonyloxy)-ethyl-N-ethylaniline, N-β-(3,4-dichlorophenylaminocarbonyloxy)-ethyl-N-ethylaniline, N-β-(2,6-diisopropylphenylaminocarbonyloxy)-ethyl-N-ethylaniline, N-β-(p-chlorophenylaminocarbonyloxy)-ethyl-N-ethylaniline, N-β-(β'-naphthylaminocarbonyloxy)-ethyl-N-ethylaniline, N-β-(benzthiazol-(2)-ylthio)ethyl-N-ethylaniline, N-β-phenoxy-n-butyl-N-ethylaniline, N-(1-phenoxy)-sec.-butyl-N-ethylaniline, N-β-benzyloxy-n-butyl-N-ethylaniline, N-(1-benzyloxy)-sec.-butyl-N-ethylaniline, N-β-benzoyloxy-n-butyl-N-ethylaniline, N-(1-benzoyloxy)-sec.-butyl-N-ethylaniline, N-β-phenylaminocarbonyloxy-n-butyl-N-ethylaniline, N-(1-phenylaminocarbonyloxy)-sec.-butyl-N-ethylaniline, N-β-phenoxy-n-propyl-N-ethylaniline, N-1-phenoxy-i-propyl-N-ethylaniline, N-β-benzyloxy-n-propyl-N-ethylaniline, N-1-benzyloxy-i-propyl-N-ethylaniline, N-β-benzoyloxy-n-propyl-N-ethylaniline, N-1-benzoyloxy-i-propyl-N-ethylaniline, N-β-phenylaminocarbonyloxy-n-propyl-N-ethylaniline, N-1-phenylaminocarbonyloxy-1-propyl-N-ethylaniline, N,N-bis-(β-phenoxyethyl)-aniline, N,N-bis-(β-benzoyloxyethyl)-aniline, N,N-bis-(β-phenylaminocarbonyloxyethyl)-aniline, N,N-bis-(β-benzyloxyethyl)-aniline, N-(β-benzoyloxy-γ-chloro)-propyl-N-ethylaniline, N-(β-phenylaminocarbonyloxy-γ-chloro)-propyl-N-ethylaniline, N-cyclohexyl-N-β-phenoxyethylaniline, N-benzyl-N-β-phenoxyethylaniline, N-n-propyl-N-β-phenoxyethylaniline, N-n-propyl-N-β-benzyloxyethylaniline, N-n-propyl-N-β-benzoyloxyethylaniline, N-n-propyl-N-β-phenylaminocarbonyloxyethylaniline, N-benzyl-N-β-benzyloxyethylaniline, N-benzyl-N-β-benzoyloxyethylaniline, N-benzyl-N-β-phenylaminocarbonyloxyethylaniline, N-β-chloroethyl-N-β-phenoxyethylaniline, N-β-hydroxyethyl-N-β-phenoxyethylaniline, N-β-cyanoethyl-N-β-phenoxyethylaniline, N-β-acetoxyethyl-N-β-phenoxyethylaniline, N-β-methoxyethyl-N-β-phenoxyethylaniline, N-β-butoxyethyl-N-β-phenoxyethylaniline, N-β-hydroxy-n-butyl-N-β-phenoxyethylaniline, N-β-hydroxy-n-propyl-N-β-phenoxyethylaniline, N-cyanomethyl-n-β-phenoxyethylaniline, N-β-carbonamidoethyl-N-β-phenoxyethylaniline, N-β-benzoyloxyethyl-N-βphenoxyethylaniline, N-β-phenylaminocarbonyloxyethyl-N-β-phenoxyethylaniline, N-β-(2,4,6-trichlorophenoxy)-ethyl-N-methylaniline, N-β-(α'-naphthoxy)-ethyl-N-methylaniline, N-β-(p-chlorobenzyloxy)-ethyl-N-methylaniline, N-β-(p-chlorobenzoyloxy)-ethyl-N-methylaniline, N-β-cyclohexyloxy-ethyl-N-methylaniline, N-β-(p-methoxybenzoyloxy)-ethyl-N-methylaniline, N-β-(p-methoxy-carbonylbenzoyloxy)-ethyl-N-methylaniline, N-β-phenoxy-ethyl-N-methylaniline, N-β-benzyloxy-ethyl-N-methylaniline, N-β-(β'-phenylethyloxy)-ethyl-N-methylaniline, N-β-(γ'-phenylpropyloxy)-ethyl-N-methylaniline, N-β-(p-chlorophenoxy)-ethyl-N-methylaniline, N-β-(p-chlorobenzyloxy)-ethyl-N-methylaniline, N-β-(o-chlorophenoxy)-ethyl-N-methylaniline, N-β-(p-methylphenoxy)ethyl-N-methylaniline, N-β-(o-methylphenoxy)-ethyl-N-methylaniline, N-β-(p-ethylphenoxy)-ethyl-N-methylaniline, N-β-(o-ethylphenoxy)-ethyl-N-methylaniline, N-β-(m-methylphenoxy)-ethyl-N-methylaniline, N-β-(p-cyclohexylphenoxy)-ethyl-N-methylaniline, N-β-(β'-naphthoxy)-ethyl-N-methylaniline, N-β-(o-isopropyloxyphenoxy)-ethyl-N-methylaniline, N-β-(o,p-dichlorophenoxy)-ethyl-N-methylaniline, N-β-(p-phenylphenoxy)-ethyl-N-methylaniline, N-β-(o-benzylphenoxy)-ethyl-N-methylaniline, N-β-(p-benzylphenoxy)-ethyl-N-methylaniline, N-β-(p-tert.-butylphenoxy)-ethyl-N-methylaniline, N-β-phenylthio-ethyl-N-methylaniline, N-β-(p-methoxy-phenoxy)-ethyl-N-methylaniline, N-β-(o-isopropyl-phenoxy)-ethyl-N-methylaniline, N-β-(phenylaminocarbonyloxy)-ethyl-N-methylaniline, N-β-(2,5-dichlorophenoxy)-ethyl-N-methylaniline, N-β-(2,4,5-trichlorophenoxy)-ethyl-N-methylaniline, N-β-cyclohexyloxy-ethyl-N-n-butylaniline, N-β-benzoyloxy-ethyl-N-n-butylaniline, N-β-(p-methoxybenzoyloxy)-ethyl-N-n-butylaniline, N-β-(p-methoxy-carbonylbenzoyloxy)-ethyl-N-n-butylaniline, N-β-phenoxy-ethyl-N-n-butylaniline, N-β-benzyloxy-ethyl-N-n-butylaniline, N-β-(β'-phenylethyloxy)-ethyl-N-n-butylaniline, N-β-(γ'-phenylpropyloxy)ethyl-N-n-butylaniline, N-β-(β'-phenyloxyethyloxy)-ethyl-N-n-butylaniline, N-β-(p-chlorophenoxy)-ethyl-N-n-butylaniline, N-β-(p-chlorobenzyloxy)-ethyl-N-n-butylaniline, N-β-(o-chlorophenoxy)-ethyl-N-n-butylaniline, N-β-(p-methylphenoxy)-ethyl-N-n-butylaniline, N-β-(o-methylphenoxy)-ethyl-N-n-butylaniline, N-β-(p-ethylphenoxy)-ethyl-N-n-butylaniline, N-β-(o-ethylphenoxy)-ethyl-N-n-butylaniline, N-β-(m-methylphenoxy)-ethyl-N-n-butylaniline, N-β-(p-cyclohexylphenoxy)-ethyl-N-n-butylaniline, N-β-(β'-naphthoxy)-ethyl-N-n-butylaniline, N-β-(o-isopropyloxyphenoxy)-ethyl-N-n-butylaniline, N-β-(o,p-dichlorophenoxy)-ethyl-N-n-butylaniline, N-β-(p-phenylphenoxy)-ethyl-N-n-butylaniline, N-β-(o-benzylphenoxy)-ethyl-N-n-butylaniline, N-β-(p-benzylphenoxy)-ethyl-N-n-butylaniline, N-β-(p-tert.-butylphenoxy)-ethyl-N-n-butylaniline, N-β-phenylthioethyl-N-n-butylaniline, N-β-(p-methoxy-phenoxy)-ethyl-N-n-butylaniline, N-β-(o-isopropyl-phenoxy)-ethyl-N-n-butylaniline, N-β-cyclohexyloxy-ethyl-N-ethyl-3-chloro-aniline, N-β-benzoyloxy-ethyl-N-ethyl-3-chloro-aniline, N-β-(p-methoxybenzoyloxy)-ethyl-N-ethyl-3-chloro-aniline, N-β(p-methoxy-carbonylbenzoyloxy)-ethyl-N-ethyl-3-chloroaniline, N-β-phenoxy-ethyl-N- 3-chloroaniline, N-β-phenoxy-ethyl-N-ethyl-3-chloro-aniline, N-β-benzyloxy-ethyl-N-ethyl-3-chloroaniline, N-β-(β'-phenylethyloxy)-ethyl-N-ethyl-3-chloroaniline, N-β-(γ'-phenylpropyloxy)-ethyl-N-ethyl-3-chloroaniline, N-β-(β'-phenyloxyethyloxy)-ethyl-N-ethyl-3-chloroaniline, N-β-(p-chlorophenoxy)-ethyl-N-ethyl-3-chloro-aniline, N-β-(p-chlorobenzyloxy)-ethyl-N-ethyl-3-chloro-aniline, N-β-(o-chlorophenoxy)-ethyl-N-ethyl-3-chloro-aniline, N-β-(p-methylphenoxy)-ethyl-N-ethyl-3-chloro-aniline, N-β-(o-methylphenoxy)-ethyl-N-ethyl-3-chloro-aniline, N-β-(p-ethylphenoxy)-ethyl-N-ethyl-3-chloro-aniline, N-β-(o-ethylphenoxy)-ethyl-N-ethyl-3-chloroaniline, N-β-(m-methylphenoxy)-ethyl-N-ethyl-3-chloro-aniline, N-β-(p-cyclohexylphenoxy)-ethyl-N-ethyl-3-chloro-aniline, N-β-(β'-naphthoxy)-ethyl-N-ethyl-3-chloroaniline, N-β-(o-isopropyloxyphenoxy)-ethyl-N-ethyl-3- chloroaniline, N-β-(o,p-dichlorophenoxy)-ethyl-N-ethyl-3-chloroaniline, N-β-(p-phenylphenoxy)-ethyl-N-ethyl-3-chloro-aniline, N-β-(o-benzylphenoxy)-ethyl-N-ethyl-3-chloro-aniline, N-β-(p-benzylphenoxy)-ethyl-3-chloro-aniline, N-β-(p-tert.-butylphenoxy)-ethyl-N-ethyl-3-chloro-aniline, N-β-phenylthioethyl-N-ethyl-3-chloro-aniline, N-β-(p-methoxy-phenoxy)-ethyl-N-ethyl-3-chloro-aniline, N-β-(o-isopropyl-phenoxy)-ethyl-N-ethyl-3-chloro-aniline, N-β-cyclohexyloxyethyl-N-ethyl-3-methoxyaniline, N-β-benzoyloxy-ethyl-N-ethyl-3-methoxyaniline, N-β-(p-methoxybenzoyloxy)-ethyl-N-ethyl-3-methoxyaniline, N-β-(p-methoxy-carbonylbenzoyloxy)-ethyl-3-methoxyaniline, N-β-phenoxy-ethyl-N-ethyl-3-methoxyaniline, N-β-benzyloxyethyl-N-ethyl-3-methoxyaniline, N-β-(β'-phenylethyloxy)-ethyl-N-ethyl-3-methoxyaniline, N-β-(γ'-phenylpropyloxy)-ethyl-N-ethyl-3-methoxyaniline, N-β-(β'-phenyloxyethyloxy)-ethyl-N-ethyl-3-methoxyaniline, N-β-(p-chlorophenoxy)-ethyl-N-ethyl-3-methoxyaniline, N-β-(p-chlorobenzyloxy)-ethyl-N-ethyl-3-methoxyaniline, N-β-(o-chlorophenoxy)-ethyl-N-ethyl-3-methoxyaniline, N-β-(p-methylphenoxy)-ethyl-N-ethyl-3-methoxyaniline, N-β-(o-methylphenoxy)-ethyl-N-ethyl-3-methoxyaniline, N-β-(p-ethylphenoxy)-ethyl-N-ethyl-3-methoxyaniline, N-β-(o-ethylphenoxy)-ethyl-N-ethyl-3-methoxyaniline, N-β-(m-methylphenoxy)-ethyl-N-ethyl-3-methoxyaniline, N-β-(p-cyclohexylphenoxy)-ethyl-N-ethyl-3-methoxyaniline, N-β-(β'-naphthoxy)-ethyl-N-ethyl-3-methoxyaniline, N-β-(o-isopropyloxyphenoxy)-ethyl-N-ethyl-3-methoxyaniline, N-β-(o,p-dichlorophenoxy)-ethyl-N-ethyl-3-methoxyaniline, N-β-(p-phenylphenoxy)-ethyl-N-ethyl-3-methoxyaniline, N-β-(o-benzylphenoxy)-ethyl-N-ethyl-3-methoxyaniline, N-β-(p-benzylphenoxy)-ethyl-N-ethyl-3-methoxyaniline, N-β-(p-tert.-butylphenoxy)-ethyl-N-ethyl-3-methoxyaniline, N-β-phenylthio-ethyl-N-ethyl-3-methoxyaniline, N-β-(p-methoxy-phenoxy)-ethyl-N-ethyl-3-methoxyaniline, N-β-(o-isopropyl-phenoxy)-ethyl-N-ethyl-3-methoxyaniline, N-β-cyclohexyloxy-ethyl-N-ethyl-m-toluidine, N-β-benzoyloxy-ethyl-N-ethyl-m-toluidine, N-β-(p-methoxybenzoyloxy)-ethyl-N-ethyl-m-toluidine, N-β-(p-methoxycarbonylbenzoyloxy)-ethyl-N-ethyl-m-toluidine, N-β-phenoxy-ethyl-N-ethyl-m-toluidine, N-β-benzyloxy-ethyl-N-ethyl-m-toluidine, N-β-(β'-phenylethyloxy)-ethyl-N-ethyl-m-toluidine, N-β-(γ'-phenylpropyloxy)-ethyl-N-ethyl-m-toluidine, N-β-(β'-phenyloxyethyloxy)-ethyl-N-ethyl-m-toluidine, N-β-(p-chlorophenoxy)-ethyl-N-ethyl-m-toluidine, N-β-(p-chlorobenzyloxy)-ethyl-N-ethyl-m-toluidine, N-β-(o-chlorophenoxy)-ethyl-N-ethyl-m-toluidine, N-β-(p-methylphenoxy)-ethyl-N-ethyl-m-toluidine, N-β-(o-methylphenoxy)-ethyl-N-ethyl-m-toluidine, N-β-(p-ethylphenoxy)-ethyl-N-ethyl-m-toluidine, N-β-(o-ethylphenoxy)-ethyl-N-ethyl-m-toluidine, N-β-(m-methylphenoxy)-ethyl-N-ethyl-m-toluidine, N-β-(p-cyclohexylphenoxy)-ethyl-N-ethyl-m-toluidine, N-β-(β'-naphthoxy)-ethyl-N-ethyl-m-toluidine, N-β-(o-isopropyloxyphenoxy)-ethyl-N-ethyl-m-toluidine, N-β-(o,p-dichlorophenoxy)-ethyl-N-ethyl-m-toluidine, N-β-(p-phenylphenoxy)-ethyl-N-ethyl-m-toluidine, N-β-(o-benzylphenoxy)-ethyl-N-ethyl-m-toluidine, N-β-(p-benzylphenoxy)-ethyl-N-ethyl-m-toluidine, N-β-(p-tert.-butylphenoxy)-ethyl-N-ethyl-m-toluidine, N-β-phenylthio-ethyl-N-ethyl-m-toluidine, N-β-(p-methoxy-phenoxy)-ethyl-N-ethyl-m-toluidine, N-β-(o-isopropyl-phenoxy)-ethyl-N-ethyl-m-toluidine, N-β-cyclohexyloxy-ethyl-2-methylindoline, N-β-benzoyloxy-ethyl-2-methylindoline, N-β-methoxybenzoyloxy)-ethyl-2-methyl-indoline, N-β-(p-methoxycarbonylbenzoyloxy)-ethyl-2-methylindoline, N-β-phenoxy-ethyl-2-methylindoline, N-β-benzyloxy-ethyl-2-methylindoline, N-β-(γ'-phenylethyloxy)-ethyl-2-methylindoline, N-β-(β'-phenyloxyethyloxy)-ethyl-2-methylindoline, N-β-(p-chlorophenoxy)-ethyl-2-methylindoline, N-β-(p-chlorobenzyloxy)-ethyl-2-methylindoline, N-β-(o-chlorophenoxy)-ethyl-2-methylindoline, N-β-(p-methylphenoxy)-ethyl-2-methylindoline, N-β-(o-methylphenoxy)-ethyl-2-methylindoline, N-β-(p-ethylphenoxy)-ethyl-2-methylindoline, N-β-(o-ethylphenoxy)-ethyl-2-methylindoline, N-β-(m-methylphenoxy)-ethyl-2-methylindoline, N-β-(p-cyclohexylphenoxy)-ethyl-2-methylindoline, N-β-(β'-naphthoxy)-ethyl-2-methylindoline, N-β-(o-isopropyloxyphenoxy)-ethyl-2-methylindoline, N-β-(o,p-dichlorophenoxy)-ethyl-2-methylindoline, N-β-(p-phenylphenoxy)-ethyl-2-methylindoline, N-β-(o-benzylphenoxy)-ethyl-2-methylindoline, N-β-(p-benzylphenoxy)-ethyl-2-methylindoline, N-β-(p-tert.-butylphenoxy)-ethyl-2-methylindoline, N-β-phenylthio-ethyl-2-methylindoline, N-β-(p-methoxy-phenoxy)-ethyl-2-methylindoline, N-β-(o-isopropyl-phenoxy)-ethyl-2-methylindoline, 2-methylindoline, N-β-cyclohexyloxy-ethyl-2,2,4-trimethyl-tetrahydroquinoline, N-β-benzoyloxy-ethyl-2,2,4-trimethyl-tetrahydroquinoline, N-β-(p-methoxybenzoyloxy)-ethyl-2,2,4-trimethyl-tetrahydroquinoline, N-β-(p-methoxy-carbonylbenzoyloxy)-ethyl-2,2,4-trimethyl-tetrahydroquinoline, N-β-phenoxy-ethyl-2,2,4-trimethyl-tetrahydroquinoline, N-β-benzyloxy-ethyl-2,2,4-trimethyl-tetrahydroquinoline, N-β-(β'-phenylethyloxy)-ethyl-2,2,4-trimethyl-tetrahydroquinoline, N-β-(γ'-phenylpropyloxy)-ethyl-2,2,4-trimethyl-tetrahydroquinoline, N-β-(β'-phenyloxyethyloxy)-ethyl-2,2,4-trimethyl-tetrahydroquinoline, N-β-(p-chlorophenoxy)-ethyl-2,2,4-trimethyl-tetrahydroquinoline, N-β-(p-chlorobenzyloxy)-ethyl-2,2,4-trimethyl-tetrahydroquinoline, N-β-(o-chlorophenoxy)-ethyl-2,2,4-trimethyl-tetrahydroquinoline, N-β-(p-methylphenoxy)-ethyl-2,2,4-trimethyl-tetrahydroquinoline, N-β-(o-methylphenoxy)-ethyl-2,2,4-trimethyl-tetrahydroquinoline, N-β-(p-ethylphenoxy)-ethyl-2,2,4-trimethyl-tetrahydroquinoline, N-β-(o-ethylphenoxy)-ethyl-2,2,4-trimethyl-tetrahydroquinoline, N-β-(m-methylphenoxy)-ethyl-2,2,4-trimethyl-tetrahydroquinoline, N-β-(p-cyclohexylphenoxy)-ethyl-2,2,4-trimethyl-tetrahydroquinoline, N-β-(β'-naphthoxy)-ethyl-2,2,4-trimethyl-tetrahydroquinoline, N-β-(o-isopropyloxyphenoxy)-ethyl-2,2,4-trimethyl-tetrahydroquinoline, N-β-(o,p-dichlorophenoxy)-ethyl-2,2,4-trimethyl-tetrahydroquinoline, N-β-(p-phenylphenoxy)-ethyl-2,2,4-trimethyl-tetrahydroquinoline, N-β-(o-benzylphenoxy)-ethyl-2,2,4-trimethyl-tetrahydroquinoline, N-β-(p-benzylphenoxy)-ethyl-2,2,4-trimethyl-tetrahydroquinoline, N-β-(p-tert.-butylphenoxy)-ethyl-2,2,4-trimethyl-tetrahydroquinoline, N-β-phenylthio-ethyl-2,2,4-trimethyl-tetrahydroquinoline, N-β-(p-methoxy-phenoxy)-ethyl-2,2,4-trimethyl-tetrahydroquinoline, N-β-(o-isopropyl-phenoxy)-ethyl-2,2,4-trimethyl-tetrahydroquinoline, N-β-(m-chlorophenoxy)-ethyl-N-n-butylaniline, N-β-(2,5-dichlorophenoxy)-ethyl-N-n-butylaniline, N-β-(2,4,5-trichlorophenoxy)-ethyl-N-n-butylaniline, N-β-(2,6-dichlorophenoxy)-ethyl-N-n-butylaniline, N-β-(2,4,6-trichlorophenoxy)-ethyl-N-n-butylaniline, N-β-(pentachlorophenoxy)-ethyl-N-n-butylaniline, N-β-(phenylaminocarbonyloxy)-ethyl-N-n-butylaniline, N-β-(p-chlorobenzyloxy)-ethyl-N-n-butylaniline, N-β-(p-chlorobenzyloxy)-ethyl-N-n-butylaniline, N-β-(α'-naphthoxy)-ethyl-N-n-butylaniline, N-β-(phenylaminocarbonyloxy)-ethyl-N-ethyl-3-chloroaniline, N-β-(p-chlorobenzyloxy)-ethyl-N-ethyl-3-chloroaniline, N-β-(p-chlorobenzoyloxy)-ethyl-N-ethyl-3-chloroaniline, N-β-(2,5-dichlorophenoxy)-ethyl-N-ethyl-3-chloroaniline, N-β-(m-chlorophenoxy)-ethyl-N-ethyl-3-chloroaniline, N-β-(α'-naphthoxy)-ethyl-N-ethyl-3-chloroaniline, N-β-(phenylaminocarbonyloxy)-ethyl-N-ethyl-3-methoxyaniline, N-β-(p-chlorobenzyloxy)-ethyl-N-ethyl-3-methoxyaniline, N-β-(p-chlorobenzoyloxy)-ethyl-N-ethyl-3-methoxyaniline, N-β-(m-chlorophenoxy)-ethyl-N-ethyl-3-methoxyaniline, N-β-(2,5-dichlorophenoxy)-ethyl-N-ethyl-3-methoxyaniline, N-β-(2,4,5-trichlorophenoxy)-ethyl-N-ethyl-3-methoxyaniline, N-β-(phenylaminocarbonyloxy)-ethyl-N-ethyl-m-toluidine, N-β-(2,5-dichlorophenoxy)-ethyl-N-ethyl-m-toluidine, N-β-(m-chlorophenoxy)-ethyl-N-ethyl-m-toluidine, N-β-(α'-naphthoxy)-ethyl-N-ethyl-m-toluidine, N-β-phenylaminocarbonyloxyethyl-tetrahydroquinoline, N-β-phenylaminocarbonyloxyethyl-2,2,4-trimethyltetrahydroquinoline, N-β-phenylaminocarbonyloxyethyl-2-methylindole, N-β-phenylaminocarbonyloxyethel-2,3,3-trimethylindoline, N-β-phenoxyethyl-2,2,4-trimethyl-7-chlorotetrahydroquinoline, N-β-phenoxyethyl-2,2,4-trimethyl-5-chlorotetrahydroquinoline, N-β-benzoyloxyethyl-2,2,4-trimethyl-5-chloro-tetrahydroquinoline, N-β-phenoxyethyl-tetrahydroquinoline, N-β-benzyloxyethyl-tetrahydroquinoline, N-β-benzoyloxyethyl-tetrahydroquinoline, N-β-(2,4-dichlorophenoxy)-ethyl-tetrahydroquinoline, N-β-(p-phenylphenoxy)-ethyl-tetrahydroquinoline, N-β-phenoxyethyl-2,3,3-trimethylindoline, N-β-benzyloxyethyl-2,3,3-trimethylindoline, N-β-benzoyloxyethyl-2,3,3-trimethylindoline, N-β-(p-phenylphenoxy)-ethyl-2,3,3-trimethylindoline, N-β-(2,4-dichlorophenoxy)-ethyl-2,3,3-trimethylindoline, N-β-cyclohexyloxyethyl-tetrahydroquinoline, N-β-cyclohexyloxyethyl-2,2,4-trimethyl-7-chloro-tetrahydroquinoline, N-β-cyclohexyloxyethyl-2,2,4-trimethyl-5-chlorotetrahydroquinoline, N-β-(2,4-dichlorophenoxy)-ethyl-N-methyl-3-chloroaniline, N-β-phenoxyethyl-N-n-butyl-3-chloroaniline, N-β-benzyloxyethyl-N-n-butyl-3-chloroaniline, N-β-phenoxyethyl-N-methyl-3-chloroaniline, N-β-benzyloxyethyl-N-methyl-3-chloroaniline, N-β-phenylaminocarbonylethyl-4-methyl-3-chloroaniline, N-β-phenylaminocarbonyloxyethyl-N-n-butyl-3-chloroaniline, N-βbenzoyloxyethyl-N-methyl-3-chloroaniline, N-β-(2,4,5-trichlorophenoxy)-ethyl-N-methyl-3-chloroaniline, N-β-(2,4-dichlorophenoxy)-ethyl-N-n-propyl-3-chloroaniline, N-β-benzoyloxyethyl-N-n-butyl-3-chloroaniline, N-β-phenoxyethyl-N-ethyl-2-methylaniline, N-β-phenoxyethyl-N-ethyl-2-methoxyaniline, N-β-phenoxyethyl-N-ethyl-3-acetylaminoaniline, N-β-phenoxyethyl-N-ethyl-2-acetylaminoaniline, N-β-phenoxyethyl-N-ethyl-3-ethoxyaniline, N-β-phenoxyethyl-N-ethyl-2-phenoxyaniline, N-β-phenoxyethyl-N-ethyl-2-benzyloxyaniline, N-β-phenoxyethyl-N-ethyl-3-benzyloxyaniline, N-β-(o-phenylphenoxy)-ethyl-N-ethyl-3-chloroaniline, N-β-(o-phenylphenoxy)-ethyl-N-methylaniline, N-β-(o-phenylphenoxy)-ethyl-N-butylaniline, N-β-(2,4,5-trichlorophenoxy)-ethyl-N-ethyl-m-toluidine, N-β-phenoxyethyl-2,3,3-trimethyl-6-chlorindoline, N-α-phenoxyethyl-b 2,3,3-trimethyl-6-chloroindoline, N-β-phenoxyethyl-2,3,3-trimethyl-4-chloroindoline, N-β-phenoxyethyl-N-ethyl-2-methyl-5-chloroaniline, N-β-benzoyloxyethyl-N-ethyl-3-trifluoromethylaniline, N-β-phenylaminocarbonyloxyethyl-N-ethyl-3-trifluoromethylaniline, N-β-phenoxyethyl-N-ethyl-2,3-dimethylaniline, N-β-phenoxyethyl-N-ethyl-α-naphthylamine, N-β-benzyloxyethyl-N-ethyl-α-naphthylamine, N-β-benzoyloxyethyl-N-ethyl-α-naphthylamine, N-β-phenylaminocarbonyloxyethyl-N-ethyl-α-naphthylamine, N-β-phenoxyethyl-N-ethyl-2-methoxy-5-chloroaniline, N-β-phenoxyethyl-N-ethyl-2-phenoxy-5-chloroaniline, N-β-phenoxyethyl-N-ethyl-2-methyl-5-methoxyaniline, N-β-phenoxyethyl-N-ethyl-2,5-dimethoxyaniline, N-β-phenoxyethyl-N-ethyl-2-methoxy-5-ethylsulphonylaniline, N-β-phenoxyethyl-2,2,4-trimethyl-8-methoxy-tetrahydroquinoline, N-γ-benzyloxypropylaniline, N-δ-benzyloxy-n-butylaniline, N-γ-(β'-phenoxyethyloxy)-propylaniline and N-δ-(β'-phenoxyethyloxy)-butylaniline.

The new dyestuffs are suitable for dyeing, printing and bulk dyeing of materials containing acid groups, above all of products which consist entirely or predominantly of polymerised unsaturated nitriles, such as acrylonitrile and vinylidene cyanide, or of acid-modified polyesters or of acid-modified polyamides. They are distinguished by a high affinity to the fibre. They are furthermore suitable for the other known applications of cationic dyestuffs, such as dyeing and printing of cellulose acetate, coir, jute, sisal and silk, of tannin-treated cotton and of paper, for the preparation of ball pen pastes and rubber-stamp inks and for use in flexographic printing. The dyeings and prints on the first-mentioned materials, especially on polyacrylonitrile, are distinguished by their very high level of fastness, above all by very good fastness to light, wet processing, rubbing, decatising, sublimation and perspiration. The dyestuffs can be employed individually or in mixtures.

The dyestuffs according to the invention and their mixtures are furthermore very suitable for dyeing shaped articles made of polymers or copolymers of acrylonitrile, asymmetrical dicyanoethylene and acid-modified aromatic polyesters in chlorohydrocarbon dye baths, particularly if they carry substances which assist the solubility in chlorohydrocarbons, such as, for example, the tertiary butyl group or the dodecyl group, or if the anion $X^-$ is the anion of a monobasic organic acid with 4 to 30 carbon atoms.

The parts mentioned in the example are parts by weight, unless stated otherwise.

EXAMPLE 1 a. Preparation of the azo dyestuff 4.2 parts of 3-amino-1,2,4-triazole are dissolved in a mixture of 40 parts of glacial acetic acid, 20 parts of water and 10 parts of concentrated sulphuric acid. The amount of nitrosylsulphuric acid which corresponds to 3.5 parts of sodium nitrite is added dropwise to the solution at −7° C. Thereafter the reaction mixture is stirred at this temperature for about 30 minutes, 0.3 part of amidosulphonic acid is then added and the mixture is again stirred for 10 minutes, and is thereafter stirred into a suspension of 50 parts of ice, 2.5 parts of concentrated sulphuric acid and 13.5 parts of N-ethyl-N-β-benzoyloxyethylaniline. After stirring for 1 hour at about −5° C, the acid salt of the dyestuff of the formula

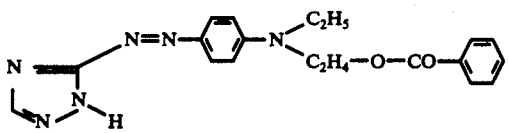

is precipitated by dropwise addition of 19.5 parts of 15% strength sodium hydroxide solution and simultaneous gradual introduction of 150 parts of ice. The dyestuff is separated from the solution, suspended in 150 parts of water and converted into the acid-free azo dyestuff by neutralising the suspension with dilute sodium hydroxide solution. The dyestuff is squeezed out and washed with water until free of salt.

b. Quaternisation of the azo dyestuff

The moist azo dyestuff is suspended in 30 parts of water. After adding 0.8 part of magnesium oxide, 10 parts of dimethyl sulphate are added dropwise to the suspension at 10° C. The temperature of the reaction mixture is raised to 15° C over the course of 1 hour, 4 parts of dimethyl sulphate are then added dropwise and a further 0.4 part of magnesium oxide is added. The temperature is then raised to 19° C over the course of 1 hour, and the suspension is stirred at this temperature for 1 hour and then heated to 96°–100° C. The resulting solution is clarified with 1 part of active charcoal and made up to 150 parts of volume by adding water. The dyestuff is precipitated from the solution by adding 37 parts of sodium chloride. After stirring for several hours, it crystallises as a mixture of the isomeric salts:

lowed by 18 parts of dimethyl sulphate added dropwise at room temperature. The alkylation and quaternisation take place in a weakly exothermic reaction. After stirring for a further 5 hours, the solvent is removed in vacuo (15 mm Hg) at 70° C. The residue is dissolved in 200 parts of boiling water, the solution is clarified with 2 parts of active charcoal and the dyestuff is precipitated as the zinc chloride double salt by adding 40 parts of sodium chloride and 10 parts of zinc chloride.

The tinctorial properties of the dyestuff obtained are identical with those of the dyestuff obtained according to Example 1(b).

Instead of being carried out with dimethyl sulphate, the quaternisation can also be carried out equally successfully with p-toluenesulphonic acid methyl ester or with methyl iodide.

The same dyestuff is also obtained if the procedure indicated in Example 1 is followed by in process step (a), instead of 3-amino-1,2,4-triazole, the equivalent amount of 5-amino-1,2,4-triazolecarboxylic acid is reacted to give the azo dyestuff of the formula

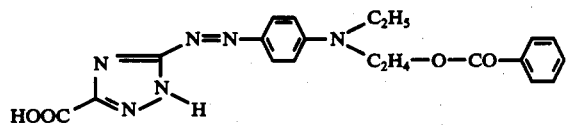

and the latter is alkylated and quaternised in accordance with one of the procedures described in Example 1(b) or in Example 2. At the same time decarboxylation occurs and the dyestuff isomer mixture described in

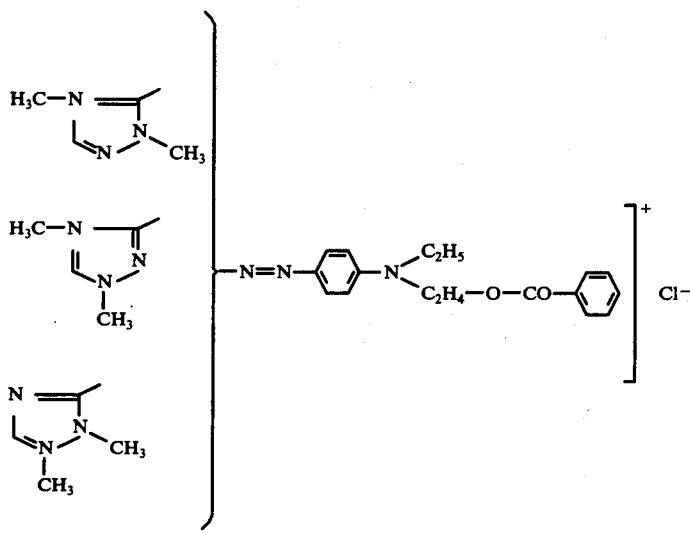

The dyestuff is filtered off and dried in vacuo. On fibre materials consisting of polyacrylonitrile, it gives clear red dyeings which are distinguished by good fastness to light and to wet processing.

EXAMPLE 2

The azo dyestuff which has been prepared according to Example 1 (a) and subsequently been dried is suspended in 45 parts of dimethylformamide, and 1.5 parts of magnesium oxide are added to the suspension, fol- Example 1 is obtained.

Equivalent dyestuffs are also obtained if the procedure in Example 1 is followed but instead of N-ethyl-N-β-benzoyloxyethylaniline the equivalent amount of one of the coupling components indicated in the table which follows is employed and the quaternisation is carried out in accordance with the process indicated in Example 1 or the process indicated in Example 2. The colour shade, also shown in the table, was obtained on fibre materials consisting of polyacrylonitrile (PAC).

Table

| Coupling component | Colour shade on PAC |
|---|---|
| N-β-Cyclohexyloxy-ethyl-N-ethylaniline | red |
| N-β-(p-Methoxybenzoyloxy)-ethyl-N-ethylaniline | " |
| N-β-(p-Methoxy-carbonylbenzoyloxy)-ethyl-N-ethylaniline | " |
| N-β-Phenoxy-ethyl-N-ethylaniline | " |
| N-β-Benzyloxy-ethyl-N-ethylaniline | " |
| N-β-(β'-Phenylethyloxy)-ethyl-N-ethylaniline | somewhat bluish-tinged red |
| N-β-(γ'-Phenylpropyloxy)-ethyl-N-ethylaniline | " |
| N-β-(β'-Phenyloxyethyloxy)-ethyl-N-ethylaniline | red |
| N-β-(p-Chlorophenoxy)-ethyl-N-ethylaniline | " |
| N-β-(p-Chlorobenzyloxy)-ethyl-N-ethylaniline | " |
| N-β-(o-Chlorophenoxy)-ethyl-N-ethylaniline | " |
| N-β-(p-Methylphenoxy)-ethyl-N-ethylaniline | " |
| N-β-(o-Methylphenoxy)-ethyl-N-ethylaniline | " |
| N-β-(p-Ethylphenoxy)-ethyl-N-ethylaniline | " |
| N-β-(o-Ethylphenoxy)-ethyl-N-ethylaniline | " |
| N-β-(m-Methylphenoxy)-ethyl-N-ethylaniline | " |
| N-β-(p-Cyclohexylphenoxy)-ethyl-N-ethylaniline | " |
| N-β-(β'-Naphthoxy)-ethyl-N-ethylaniline | somewhat bluish-tinged red |
| N-β-(o-Isopropyloxyphenoxy)-ethyl-N-ethylaniline | red |
| N-β-(o,p-Dichlorophenoxy)-ethyl-N-ethylaniline | " |
| N-β-(p-Phenylphenoxy)-ethyl-N-ethylaniline | |
| Mixture of | |
| N-β-(o-benzylphenoxy)-ethyl-N-ethylaniline and | " |
| N-β-(p-benzylphenoxy)-ethyl-N-ethylaniline | " |
| N-β-(p-tert.-Butylphenoxy)-ethyl-N-ethylaniline | " |
| N-β-Phenylthio-ethyl-N-ethylaniline | " |
| N-β-(p-Methoxy-phenoxy)-ethyl-N-ethylaniline | " |
| N-β-(o-Isopropyl-phenoxy)-ethyl-N-ethylaniline | " |
| Nβ-(1,2,3,4-Tetrahydronaphth-(6)-oxy)-ethyl-N-ethylaniline | " |
| N-β-(1,2,3,4-Tetrahydronaphth-(1)-oxy)-ethyl-N-ethylaniline | " |
| N-β-(Phenylaminocarbonyloxy)-ethyl-N-ethylaniline | " |
| N-γ-Phenoxypropyl-N-ethylaniline | " |
| N-δ-Phenoxybutyl-N-ethylaniline | " |
| N-β-(p-tert.-Butylphenylthio)-ethyl-N-ethylaniline | " |
| N-β-Pentachlorophenylthio-ethyl-N-ethylaniline | " |
| N-β-(3,5-Dimethylphenoxy)-ethyl-N-ethylaniline | " |
| N-β-(3,5-Dimethyl-4-chlorophenoxy)-ethyl-N-ethylaniline | " |
| N-β-[p-(2-Phenylisopropyl)-phenoxy]-ethyl-N-ethylaniline | " |
| N-β-(m-Chlorophenoxy)-ethyl-N-ethylaniline | " |
| N-β-(2,5-Dichlorophenoxy)-ethyl-N-ethylaniline | " |
| N-β-(2,4,5-Trichlorophenoxy)-ethyl-N-ethylaniline | " |
| N-β-(2,6-Dichlorophenoxy-ethyl-N-ethylaniline | " |
| N-β(2,4,6-Trichlorophenoxy)-ethyl-N-ethylaniline | " |
| N-β-(Pentachlorophenoxy)-ethoxy-N-ethylaniline | " |
| N-β-p-Chlorophenylthio)-ethyl-N-ethylaniline | " |
| N-β-(2-Chloro-6-methylphenoxy)-ethyl-N-ethylaniline | " |
| N-β-(2-Methyl-5-chlorophenoxy)-ethyl-N-ethylaniline | " |
| N-β-(2-Methyl-4-chlorophenoxy)-ethyl-N-ethylaniline | " |
| N-β-(2-Methyl-3-chlorophenoxy)-ethyl-N-ethylaniline | " |
| N-β-(2-Chloro-5-methylphenoxy)-ethyl-N-ethylaniline | " |
| N-β-(3-Methyl-4-chlorophenoxy)-ethyl-N-ethylaniline | " |
| N-β-(2,4,6-Trichloro-3-methylphenoxy)-ethyl-N-ethylaniline | " |
| N-β-(p-Methylphenylthio)-ethyl-N-ethylaniline | " |
| N-β-(2,3-Dimethylphenoxy)-ethyl-N-ethylaniline | " |
| N-β-(3,4-Dimethylphenoxy)-ethyl-N-ethylaniline | " |
| N-β-(2,6-Dimethylphenoxy)-ethyl-N-ethylaniline | " |
| N-β-(2,4-Dimethylphenoxy)-ethyl-N-ethylaniline | " |
| N-β-(2,5-Dimethylphenoxy)-ethyl-N-ethylaniline | " |
| N-β-(3-Methyl-5-ethylphenoxy)-ethyl-N-ethylaniline | " |
| N-β-(2,3,5-Trimethylphenoxy)-ethyl-N-ethylaniline | " |
| N-β-(o-sec.-Butylphenoxy)-ethyl-N-ethylaniline | " |
| N-β-(2-Isopropyl-5-methylphenoxy)-ethyl-N-ethylaniline | " |
| N-β-(3-Methyl-5-isopropylphenoxy)-ethyl-N-ethylaniline | " |
| N-β-[p-(1,1,3,3-Tetramethylbutyl)-phenoxy]-ethyl-N-ethylaniline | " |
| N-β-Nonylphenoxyethyl-N-ethylaniline | " |
| N-β-Dodecylphenoxyethyl-N-ethylaniline | " |
| N-β-(2,6-Diisopropylphenoxy)-ethyl-N-ethylaniline | " |
| N-β-(2-Cyclohexylphenoxy)-ethyl-N-ethylaniline | " |
| N-β-(α'-Naphthoxy)-ethyl-N-ethylaniline | " |
| N-β-(o-Phenylphenoxy)-ethyl-N-ethylaniline | " |
| N-β-(m-Phenylphenoxy)-ethyl-N-ethylaniline | " |
| N-β-(o-Ethoxy-phenoxy)-ethyl-N-ethylaniline | " |
| N-β-(m-Methoxy-phenoxy)-ethyl-N-ethylaniline | " |
| N-β-(p-Phenylsulphonyl-phenoxy)-ethyl-N-ethylaniline | " |
| N-β-(3-Methyl-4-methylthiophenoxy)-ethyl-N-ethylaniline | " |
| N-β-(p-Methylcyclohexyloxy)-ethyl-N-ethylaniline | " |
| N-β-(o-Methylcyclohexyloxy)-ethyl-N-ethylaniline | " |
| N-β-(m-Methylcyclohexyloxy)-ethyl-N-ethylaniline | " |
| N-β-(Decahydronaphth(2)oxy)-ethyl-N-ethylaniline | " |
| N-β-Menthyl-ethyl-N-ethylaniline | " |
| N-β-Borneyl-ethyl-N-ethylaniline | " |
| N-β-(o-Chlorobenzyloxy)-ethyl-N-ethylaniline | " |
| N-β-(p-Methylbenzyloxy)-ethyl-N-ethylaniline | " |
| N-β-(p-Methoxybenzyloxy)-ethyl-N-ethylaniline | " |
| N-β-(o-Methylbenzyloxy)-ethyl-N-ethylaniline | " |
| N-β-(m-Chlorobenzyloxy)-ethyl-N-ethylaniline | " |
| N-β-(m-Methylbenzyloxy)-ethyl-N-ethylaniline | " |
| N-β-(p-Chlorobenzoyloxy)-ethyl-N-ethylaniline | " |
| N-β-(p-Methylbenxoyloxy)-ethyl-N-ethylaniline | " |
| N-β-(Chlorobenzoyloxy)-ethyl-N-ethylaniline | " |
| N-β-(3,4-Dichlorobenzoyloxy)-ethyl-N-ethylaniline | " |
| N-β-(2-Methylbenzoyloxy)-ethyl-N-ethylaniline | " |
| N-β-(p-Methoxybenzoyloxy)-ethyl-N-ethylaniline | " |

Table-continued

| Coupling component | Colour shade on PAC |
|---|---|
| N-β-(m-Chlorobenzoyloxy)-ethyl-N-ethylaniline | " |
| N-β-(2,5-Dichlorobenzoyloxy)-ethyl-N-ethylaniline | " |
| N-β-(2,4-Dichlorobenzoyloxy)-ethyl-N-ethylaniline | " |
| N-β-(2-Bromobenzoyloxy)-ethyl-N-ethylaniline | " |
| N-β-(m-Methylbenzoyloxy)-ethyl-N-ethylaniline | " |
| N-β-(p-tert.-Butylbenzoyloxy)-ethyl-N-ethylaniline | " |
| N-β-[Naphth-(2)-oyloxy]-ethyl-N-ethylaniline | " |
| N-β-[Naphth-(1)-oyloxy]-ethyl-N-ethylaniline | " |
| N-β-(p-Phenylbenzoyloxy)-ethyl-N-ethylaniline | " |
| N-β-(2-Methoxybenzoyloxy)-ethyl-N-ethylaniline | " |
| N-β-(3-Methoxybenzoyloxy)-ethyl-N-ethylaniline | " |
| N-β-(p-Methoxycarbonylphenoxy)-ethyl-N-ethylaniline | " |
| N-β-(p-Ethylthio-ochlorobenzoyloxy)-ethyl-N-ethylaniline | " |
| N-β-(2,6-Dichlorobenzyloxy)-ethyl-N-ethylaniline | " |
| N-β-(3,4-Dichlorobenzyloxy)-ethyl-N-ethylaniline | " |
| N-β-[1,2,3,4-Tetrahydronaphth-(6)-oxymethoxy]-ethyl-N-ethylaniline | " |
| N-β-(3-Chlorophenylaminocarbonyloxy)-ethyl-N-ethylaniline | " |
| N-β-(3,4-Dichlorophenylaminocarbonyloxy)-ethyl-N-ethylaniline | " |
| N-β-(2,6-Diisopropylphenylaminocarbonyloxy)-ethyl-N-ethylaniline | " |
| N-β-(p-Chlorophenylaminocarbonyloxy)-ethyl-N-ethylaniline | " |
| N-β-(β'-Naphthylaminocarbonyloxy)-ethyl-N-ethylaniline | " |
| N-β-(Benzthiazol-(2)-ylthio)-ethyl-N-ethylaniline | " |
| Mixture of N-β-phenoxy-n-butyl-N-ethylaniline and N-(1-phenoxy)-sec.-butyl-N-ethylanilne | " |
| Mixture of N-β-benzyloxy-n-butyl-N-ethylaniline and N-(1-benzyloxy)-sec.-butyl-N-ethylaniline | " |
| Mixture of N-β-benzoyloxy-n-butyl-N-ethylaniline and N-(1-benzoyloxy)-sec.-butyl-N-ethylaniline | " |
| Mixture of N-β-phenylaminocarbonyloxy-n-butyl-N-ethylaniline and N-(1-phenylaminocarbonyloxy)-sec.-butyl-N-ethylaniline | " |
| Mixture of N-β-phenoxy-n-propyl-N-ethylaniline and N-1-phenoxy-i-propyl-N-ethylaniline | " |
| Mixture of N-β-benzyloxy-n-propyl-N-ethylaniline and N-1-benzyloxy-i-propyl-N-ethylaniline | " |
| Mixture of N-β-benzoyloxy-n-propyl-N-ethylaniline and N-1-benzoyloxy-i-propyl-N-ethylaniline | " |
| Mixture of N-β-phenylaminocarbonyloxy-n-propyl-N-ethylaniline and N-1-phenylaminocarbonyloxy-i-propyl-N-ethylaniline | " |
| N,N-bis-(β-Phenoxyethyl)-aniline | " |
| N,N-bis-(β-Benzoyloxyethyl)-aniline | " |
| N,N-bis-(β-Phenylaminocarbonyloxyethyl)-aniline | " |
| N,N-bis-(β-Benzyloxyethyl)-aniline | " |
| N-(β-Benzoyloxy-γ-chloro)-propyl-N-ethylaniline | " |
| N-(β-Phenylaminocarbonyloxy-γ-chloro)-propyl-N-ethylaniline | " |
| N-Cyclohexyl-N-β-phenoxyethylaniline | " |
| N-Benzyl-N-β-phenoxyethylaniline | " |
| N-n-Propyl-N-β-phenoxy-ethylaniline | " |
| N-n-Propyl-N-β-benzyloxyethylaniline | " |
| N-n-Propyl-N-β-benzoyloxyethylaniline | " |
| N-n-Propyl-N-β-phenylaminocarbonyloxyethylaniline | " |
| N-Benzyl-N-β-benzyloxyethylaniline | somewhat yellowish-tinged red |
| N-Benzyl-N-β-benzoyloxyethylaniline | " |
| N-Benzyl-N-β-phenylaminocarbonyloxyethylaniline | " |
| N-β-Chloroethyl-N-β-phenoxyethylaniline | red |
| N-β-Hydroxyethyl-N-β-phenoxyethylaniline | " |
| N-β-Cyanoethyl-N-β-phenoxyethylaniline | somewhat yellowish-tinged red |
| N-β-Acetoxyethyl-N-β-phenoxyethylaniline | red |
| N-β-Methoxyethyl-N-β-phenoxyethylaniline | " |
| N-β-Butoxyethyl-N-β-phenoxyethylaniline | " |
| N-β-Hydroxy-n-butyl-N-β-phenoxyethylaniline | " |
| N-β-Hydroxy-n-propyl-N-β-phenoxyethylaniline | " |
| N-Cyanomethyl-n-β-phenoxyethylaniline | yellowish-tinged red |
| N-β-Carbonamidoethyl-N-β-phenoxyethylaniline | red |
| N-β-Benzoyloxyethyl-N-β-phenoxyethylaniline | " |
| N-β-Phenylaminocarbonyloxyethyl-N-β-phenoxyethylaniline | " |
| N-β-(2,4,6-Trichlorophenoxy)-ethyl-N-methylaniline | " |
| N-β-(α'-Naphthoxy)-ethyl-N-methylaniline | " |
| N-β-(p-Chlorobenzyloxy)-ethyl-N-methylaniline | " |
| N-β-(p-Chlorobenzoyloxy)-ethyl-N-methylaniline | " |
| N-β-Cyclohexyloxy-ethyl-N-methylaniline | " |
| N-β-Benzoyloxy-ethyl-N-methylaniline | " |
| N-β-(p-Methoxybenzoyloxy)-ethyl-N-methylaniline | " |
| N-β-(p-Methoxy-carbonylbenzoyloxy)-ethyl-N-methylaniline | " |
| N-β-Phenoxy-ethyl-N-methylaniline | " |
| N-β-Benzyloxy-ethyl-N-methylaniline | " |
| N-β-(β'-Phenylethyloxy)-ethyl-N-methylaniline | " |
| N-β-(γ'-Phenylpropyloxy)-ethyl-N-methylaniline | " |
| N-β-(β'-Phenyloxyethyloxy)-ethyl-N-methylaniline | " |
| N-β-(p-Chlorophenoxy)-ethyl-N-methylaniline | " |
| N-β-(p-Chlorobenzyloxy)-ethyl-N-methylaniline | " |
| N-β-(o-Chlorophenoxy)-ethyl-N-methylaniline | " |
| N-β-(p-Methylphenoxy)-ethyl-N-methylaniline | " |
| N-β-(o-Methylphenoxy)-ethyl-N-methylaniline | " |
| N-β-(p-Ethylphenoxy)-ethyl-N-methylaniline | " |
| N-β-(o-Ethylphenoxy)-ethyl-N-methylaniline | " |

Table-continued

| Coupling component | Colour shade on PAC |
|---|---|
| N-β-(m-Methylphenoxy)-ethyl-N-methylaniline | " |
| N-β-(p-Cyclohexylphenoxy)-ethyl-N-methylaniline | " |
| N-β-(β'-Naphthoxy)-ethyl-N-methylaniline | " |
| N-β-(o-Isopropyloxyphenoxy)-ethyl-N-methylaniline | " |
| N-β-(o,p-Dichlorophenoxy)-ethyl-N-methylaniline | " |
| N-β-(p-Phenylphenoxy)-ethyl-N-methylaniline | " |
| Mixture of | |
| N-β-(o-benzylphenoxy)-ethyl-N-methylaniline and | |
| N-β-(p-benzylphenoxy)-ethyl-N-methylaniline | " |
| N-β-(p-tert.-Butylphenoxy)-ethyl-N-methylaniline | " |
| N-β-Phenylthio-ethyl-N-methylaniline | " |
| N-β-(p-Methoxy-phenoxy)-ethyl-N-methylaniline | " |
| Nβ-(o-Isopropyl-phenoxy)-ethyl-N-methylaniline | " |
| N-β-(Phenylaminocarbonyloxy)-ethyl-N-methylaniline | " |
| N-β-(2,5-Dichlorophenoxy)-ethyl-N-methylaniline | " |
| N-β-(2,4,5-Trichlorophenoxy)-ethyl-N-methylaniline | " |
| N-β-Cyclohexyloxy-ethyl-N-n-butylaniline | bluish-tinged red |
| N-β-Benzoyloxy-ethyl-N-n-butylaniline | red |
| N-β-(p-Methoxybenzoyloxy)-ethyl-N-n-butylaniline | " |
| N-β-(p-Methoxy-carbonylbenzoyloxy)-ethyl-N-n-butylaniline | " |
| N-β-Phenoxy-ethyl-N-n-butylaniline | " |
| N-β-Benzyloxy-ethyl-N-n-butylaniline | somewhat bluish-tinged red |
| N-β-(β'-Phenylethyloxy)-ethyl-N-n-butylaniline | bluish-tinged red |
| N-β-(γ'-Phenylpropyloxy)-ethyl-N-n-butylaniline | " |
| N-β-(β'-Phenyloxyethyloxy)-ethyl-N-n-butylaniline | red |
| N-β-(p-Chlorophenoxy)-ethyl-N-n-butylaniline | " |
| N-β-(p-Chlorobenzyloxy)-ethyl-N-n-butylaniline | " |
| N-β-(o-Chlorophenoxy)-ethyl-N-n-butylaniline | " |
| N-β-(p-Methylphenoxy)-ethyl-N-n-butylaniline | " |
| N-β-(o-Methylphenoxy)-ethyl-N-n-butylaniline | " |
| N-β-(p-Ethylphenoxy)-ethyl-N-n-butylaniline | " |
| N-β-(o-Ethylphenoxy)-ethyl-N-n-butylaniline | " |
| N-β-(m-Methylphenoxy)-ethyl-N-n-butylaniline | " |
| N-β-(p-Cyclohexylphenoxy)-ethyl-N-n-butylaniline | somewhat bluish-tinged red |
| N-β-(β'-Naphthoxy)-ethyl-N-n-butylaniline | bluish-tinged red |
| N-β-(o-Isopropyloxyphenoxy)-ethyl-N-n-butylaniline | red |
| N-β-(o,p-Dichlorophenoxy)-ethyl-N-n-butylaniline | " |
| N-β-(p-Phenylphenoxy)-ethyl-N-n-butylaniline | bluish-tinged red |
| Mixture of | |
| N-β-(o-benzylphenoxy)-ethyl-N-n-butylaniline and | |
| N-β-(p-benzylphenoxy)-ethyl-N-n-butylaniline | " |
| N-β-(p-tert.-Butylphenoxy)-ethyl-N-n-butylaniline | " |
| N-β-Phenylthio-ethyl-N-n-butylaniline | " |
| N-β-(p-Methoxy-phenoxy)-ethyl-N-n-butylaniline | red |
| N-β-(o-Isopropyl-phenoxy)-ethyl-N-n-butylaniline | "" |
| -Cyclohexyloxy-ethyl-3-chloraniline | somewhat yellowish-tinged red |
| N-β-Benzoyloxy-ethyl-N-ethyl-3-chloroaniline | " |
| N-β-(p-Methoxybenzoyloxy)-ethyl-N-ethyl-3-chloroaniline | red |
| N-β-(p-Methoxy-carbonylbenzoyloxy)-ethyl-N-ethyl-3-chloroaniline | " |
| N-β-Phenoxy-ethyl-N-ethyl-3-chloroaniline | somewhat yellowish-tinged red |
| N-β-Benzyloxy-ethyl-N-ethyl-3-chloroaniline | red |
| N-β-(β'-Phenylethyloxy)-ethyl-N-ethyl-3-chloroaniline | " |
| N-β-(γ-Phenylpropyloxy)-ethyl-N-ethyl-3-chloroaniline | " |
| N-β-(β'-Phenyloxyethyloxy)-ethyl-N-ethyl-3-chloroaniline | " |
| N-β-(p-Chlorophenoxy)-ethyl-N-ethyl-3-Chloroaniline | " |
| Nβ-(p-Chlorobenzyloxy)-ethyl-N-ethyl-3-chloroaniline | " |
| N-β-(o-Chlorophenoxy)-ethyl-N-ethyl-3-chloroaniline | somewhat yellowish-tinged red |
| N-β-(p-Methylphenoxy)-ethyl-N-ethyl-3-chloroaniline | " |
| N-β-(o-Methylphenoxy)-ethyl-N-ethyl-3-chloroaniline | " |
| N-β-(p-Ethylphenoxy)-ethyl-N-ethyl-3-chloroaniline | " |
| N-β-(o-Ethylphenoxy)-ethyl-N-ethyl-3-chloroaniline | " |
| N-β-(m-Methylphenoxy)-ethyl-N-ethyl-3-chloroaniline | red |
| N-β-(p-Cyclohexylphenoxy)-ethyl-N-ethyl-3-chloroaniline | " |
| N-β-(β'-Naphthoxy)-ethyl-N-ethyl-3-chloroaniline | " |
| N-β-(o-Isopropyloxyphenoxy)-ethyl-N-ethyl-3-chloroaniline | somewhat yellowish-tinged red |
| N-β-(o,p-Dichlorophenoxy)-ethyl-N-ethyl-3-chloroaniline | " |
| N-β-(p-Phenylphenoxy)-ethyl-N-ethyl-3-chloroaniline | red |
| Mixture of | |
| N-β-(o-benzylphenoxy)-ethyl-N-ethyl-3-chloroaniline and | |
| N-β-(p-benzylphenoxy)-ethyl-N-ethyl-3-chloroaniline | " |
| N-β-(p-tert.-Butylphenoxy)-ethyl-N-ethyl-3-chloroaniline | " |
| N-β-Phenylthio-ethyl-N-ethyl-3-chloroaniline | " |
| N-β-(p-Methoxy-phenoxy)-ethyl-N-ethyl-3-chloroaniline | " |
| N-β-(o-Isopropyl-phenoxy)-ethyl-N-ethyl-3-chloroaniline | somewhat yellowish-tinged red |
| N-β-Cyclohexyloxy-ethyl-N-ethyl-3-methoxyaniline | yellowish-tinged red |
| N-β-Benzoyloxy-ethyl-N-ethyl-3-methoxyaniline | " |
| N-β-(p-Methoxybenzoyloxy)-ethyl-N-ethyl-3-methoxyaniline | " |
| N-β-(p-Methoxy-carbonylbenzoyloxy)-ethyl-N-ethyl-3-methoxyaniline | " |
| N-β-Phenoxy-ethyl-N-ethyl-3-methoxyaniline | clear yellowish-tinged red |
| N-β-Benzyloxy-ethyl-N-ethyl-3-methoxyaniline | yellowish-tinged red |
| N-β-(β'-Phenylethyloxy)-ethyl-N-ethyl-3-methoxyaniline | " |
| N-β-(γ'-Phenylpropyloxy)-ethyl-N-ethyl-3-methoxyaniline | " |
| N-β-(β'-Phenyloxyethyloxy)-ethyl-N-ethyl-3-methoxyaniline | " |
| N-β-(p-Chlorophenoxy)-ethyl-N-ethyl-3-methoxyaniline | " |
| N-β-(p-Chlorobenzyloxy(ethyl-N-ethyl-3-methoxyaniline | " |
| N-β-(o-Chlorophenoxy)-ethyl-N-(ethyl-3-methoxyaniline | " |
| N-β-(p-Methylphenoxy)-ethyl-N-ethyl-3-methoxyaniline | " |
| N-β-(o-Methylphenoxy)-ethyl-N-ethyl-3-methoxyaniline | " |
| N-β-(p-Ethylphenoxy)-ethyl-N-ethyl-3-methoxyaniline | " |
| N-β-(o-Ethylphenoxy)-ethyl-N-ethyl-3-methoxyaniline | " |
| N-β-(m-Methylphenoxy)-ethyl-N-ethyl-3-methoxyaniline | " |
| N-β-(p-Cyclohexylphenoxy)-ethyl-N-ethyl-3-methoxyaniline | " |
| N-β-(β'-Naphthoxy)-ethyl-N-ethyl-3-methoxyaniline | " |

Table-continued

| Coupling component | Colour shade on PAC |
|---|---|
| N-β-(o-Isopropyloxyphenoxy)-ethyl-N-ethyl-3-methoxyaniline | " |
| N-β-(o,p-Dichlorophenoxy)-ethyl-N-ethyl-3-methoxyaniline | " |
| N-β-(p-Phenylphenoxy)-ethyl-N-ethyl-3-methoxyaniline | " |
| Mixture of | |
| N-β-(o-benzylphenoxy)-ethyl-N-ethyl-3-methoxyaniline and | |
| N-β-(p-benzylphenoxy)-ethyl-N-ethyl-3-methoxyaniline | " |
| N-β-(p-tert.-Butylphenoxy)-ethyl-N-ethyl-3-methoxyaniline | " |
| N-β-Phenylthio-ethyl-N-ethyl-3-methoxyaniline | red |
| N-β-(p-Methoxy-phenoxy)-ethyl-N-ethyl-3-methoxyaniline | yellowish-tinged red |
| N-β-(o-Isopropyl-phenoxy)-ethyl-N-ethyl-3-methoxyaniline | " |
| N-β-Cyclohexyloxy-ethyl-N-ethyl-m-toluidine | bluish-tinged red |
| N-β-Benzoyloxy-ethyl-N-ethyl-m-toluidine | red |
| N-β-(p-Methoxybenzoyloxy)-ethyl-N-ethyl-m-toluidine | " |
| N-β-(p-Methoxy-carbonylbenzoyloxy)-ethyl-N-ethyl-m-toluidine | " |
| N-β-Phenoxy-ethyl-N-ethyl-m-toluidine | " |
| N-β-Benzyloxy-ethyl-N-ethyl-m-toluidine | " |
| N-β-(β'-Phenylethyloxy)-ethyl-N-ethyl-m-toluidine | " |
| N-β-(γ'-Phenylpropyloxy)-ethyl-N-ethyl-m-toluidine | " |
| N-β-(β'-Phenyloxyethyloxy)-ethyl-N-ethyl-m-toluidine | " |
| N-β-(p-Chlorophenoxy)-ethyl-N-ethyl-m-toluidine | bluish-tinged red |
| N-β-(p-Chlorobenzyloxy)-ethyl-N-ethyl-m-toluidine | " |
| N-β-(o-Chlorophenoxy)-ethyl-N-ethyl-m-toluidine | red |
| N-β-(p-Methylphenoxy)-ethyl-N-ethyl-m-toluidine | " |
| N-β-(o-Methylphenoxy)-ethyl-N-ethyl-m-toluidine | " |
| N-β-(p-Ethylphenoxy)-ethyl-N-ethyl-m-toluidine | bluish-tinged red |
| N-β-(o-Ethylphenoxy)-ethyl-N-ethyl-m-toluidine | red |
| N-β-(m-Methylphenoxy)-ethyl-N-ethyl-m-toluidine | " |
| N-β-(p-Cyclohexylphenoxy)-ethyl-N-ethyl-m-toluidine | bluish-tinged red |
| N-β-(β'-Naphthoxy)-ethyl-N-ethyl-m-toluidine | " |
| N-β-(o-Isopropyloxyphenoxy)-ethyl-N-ethyl-m-toluidine | red |
| N-β-(o,p-Dichlorophenoxy)-ethyl-N-ethyl-m-toluidine | " |
| N-β-(p-Phenylphenoxy)-ethyl-N-ethyl-m-toluidine | bluish-tinged red |
| Mixture of | |
| N-β-(o-benzylphenoxy)-ethyl-N-ethyl-m-toluidine and | |
| N-β-(p-benzylphenoxy)-ethyl-N-ethyl-m-toluidine | " |
| N-β-(p-tert.-Butylphenoxy)-ethyl-N-ethyl-m-toluidine | " |
| N-β-Phenylthio-ethyl-N-ethyl-m-toluidine | " |
| N-β-(o-Isopropyl-phenoxy)-ethyl-N-ethyl-m-toluidine | red |
| N-β-(Benzthiazol-(2)ylthio)-ethyl-N-ethyl-m-toluidine | bluish-tinged red |
| N-β-Cyclohexyloxy-ethyl-2-methylindoline | strongly bluish-tinged red |
| N-β-Benzoyloxy-ethyl-2-methylindoline | bluish-tinged red |
| N-β-(p-Methoxybenzoyloxy)-ethyl-2-methylindoline | " |
| N-β-(p-Methoxy-carbonylbenzoyloxy)-ethyl-2-methylindoline | " |
| N-β-Phenoxy-ethyl-2-methylindoline | " |
| N-β-Benzyloxy-ethyl-2-methylindoline | " |
| N-β-(β'-Phenylethyloxy)-ethyl-2-methylindoline | " |
| N-β-(γ'-Phenylpropyloxy)-ethyl-2-methylindoline | " |
| N-β-(β'-Phenyloxyethyloxy)-ethyl-2-methylindoline | " |
| N-β-(p-Chlorophenoxy)-ethyl-2-methylindoline | " |
| N-β-(p-Chlorobenzyloxy)-ethyl-2-methylindoline | " |
| N-β-(o-Chlorophenoxy)-ethyl-2-methylindoline | " |
| N-β-(p-Methylphenoxy)-ethyl-2-methylindoline | " |
| N-β-(o-Methylphenoxy)-ethyl-2-methylindoline | " |
| N-β-(p-Ethylphenoxy)-ethyl-2-methylindoline | " |
| N-β-(o-Ethylphenoxy)-ethyl-2-methylindoline | " |
| N-β-(m-Methylphenoxy)-ethyl-2-methylindoline | " |
| N-β-(p-Cyclohexyphenoxy)-ethyl-2-methylindoline | " |
| N-β-(β'-Naphthoxy)-ethyl-2-methylindoline | " |
| N-β-(o-Isopropyloxyphenoxy)-ethyl-2-methylindoline | " |
| N-β-(o,p-Dichlorophenoxy)-ethyl-2-methylindoline | " |
| N-β-(p-Phenylphenoxy)-ethyl-2-methylindoline | " |
| Mixture of | |
| N-β-(o-benzylphenoxy)-ethyl-2-methylindoline and | |
| N-β-(p-benzylphenoxy)-ethyl-2-methylindoline | " |
| N-β-(p-tert.-Butylphenoxy)-ethyl-2-methylindoline | " |
| N-β-Phenylthio-ethyl-2-methylindoline | " |
| N-β-(p-Methoxy-phenoxy)-ethyl-2-methylindoline | " |
| N-β-(o-Isopropyl-phenoxy)-ethyl-2-methylindoline | " |
| N-β-Cyclohexyloxy-2,2,4-trimethyl-tetrahydroquinoline | " |
| N-β-Benzoyloxy-ethyl-2,2,4-trimethyl-tetrahydroquinoline | " |
| N-β-(p-Methoxybenzoyloxy)-ethyl-2,2,4-trimethyl-tetrahydroquinoline | " |
| N-β-(p-Methoxy-carbonylbenzoyloxy)-ethyl-2,2,4-trimethyl-tetrahydroquinoline | " |
| N-β-Phenoxy-ethyl-2,2,4-trimethyl-tetrahydroquinoline | " |
| N-β-Benzyloxy-ethyl-2,2,4-trimethyl-tetrahydroquinoline | " |
| N-β-(β'-Phenylethyloxy)-ethyl-2,2,4-trimethyl-tetrahydroquinoline | " |
| B-β-(γ'-Phenylpropyloxy)-ethyl-2,2,4-trimethyl-tetrahydroquinoline | " |
| N-β-(β'-Phenyloxyethyloxy)-ethyl-2,2,4-trimethyl-tetrahydroquinoline | " |
| N-β-(p-Chlorophenoxy)-ethyl-2,2,4-trimethyl-tetrahydroquinoline | " |
| N-β-(p-Chlorobenzyloxy)-ethyl-2,2,4-trimethyl-tetrahydroquinoline | " |
| N-β-(o-Chlorophenoxy)-ethyl-2,2,4-trimethyl-tetrahydroquinoline | " |
| N-β-(p-Methylphenoxy)-ethyl-2,2,4-trimethyl-tetrahydroquinoline | " |
| N-β-(o-Methylphenoxy)-ethyl-2,2,4-trimethyl-tetrahydroquinoline | " |
| N-β-(p-Ethylphenoxy)-ethyl-2,2,4-trimethyl-tetrahydroquinoline | " |
| N-β-(o-Ethylphenoxy)-ethyl-2,2,4-trimethyl-tetrahydroquinoline | " |
| N-β-(m-Methylphenoxy)-ethyl-2,2,4-trimethyl-tetrahydroquinoline | " |
| N-β-(p-Cyclohexylphenoxy)-ethyl-2,2,4-trimethyl-tetrahydroquinoline | " |
| N-β-(β'-Naphthoxy)-ethyl-2,2,4-trimethyl-tetrahydroquinoline | " |
| N-β-(o-Isopropyloxyphenoxy)-ethyl-2,2,4-trimethyl-tetrahydroquinoline | " |
| N-β-(o,p-Dichlorophenoxy)-ethyl-2,2,4-trimethyl-tetrahydroquinoline | " |
| N-β-(p-Phenylphenoxy)-ethyl-2,2,4-trimethyl-tetrahydroquinoline | " |
| Mixture of | |
| N-β-(o-benzylphenoxy)-ethyl-2,2,4-trimethyl-tetrahydroquinoline and | |

Table-continued

| Coupling component | Colour shade on PAC |
|---|---|
| N-β-(p-benzylphenoxy)-ethyl-2,2,4-trimethyl-tetrahydroquinoline | " |
| N-β-(p-tert.-Butylphenoxy)-ethyl-2,2,4-trimethyl-tetrahydroquinoline | " |
| N-β-Phenylthio-ethyl-2,2,4-trimethyl-tetrahydroquinoline | bluish-tinged red |
| N-β-(p-Methoxy-phenoxy)-ethyl-2,2,4-trimethyl-tetrahydroquinoline | " |
| N-β-(o-Isopropyl-phenoxy)-ethyl-2,2,4-trimethyl-tetrahydroquinoline | " |
| N-β-(m-Chlorophenoxy)-ethyl-N-n-butylaniline | red |
| N-β-(2,5-Dichlorophenoxy)-ethyl-N-n-butylaniline | " |
| N-β-(2,4,5-Trichlorophenoxy)-ethyl-N-n-butylaniline | " |
| N-β-(2,6-Dichlorophenoxy)-ethyl-N-n-butylaniline | " |
| N-β-(2,4,6-Trichlorophenoxy)-ethyl-N-n-butylaniline | " |
| N-β-(Pentachlorophenoxy)-ethyl-N-n-butylaniline | " |
| N-β-(Phenylaminocarbonyloxy)-ethyl-N-n-butylaniline | " |
| N-β-(p-Chlorobenzyloxy)-ethyl-N-n-butylaniline | " |
| N-β-(p-Chlorobenzoyloxy)-ethyl-N-n-butylaniline | " |
| N-β-(α'-Naphthoxy)-ethyl-N-n-butylaniline | bluish-tinged red |
| N-β-(Phenylaminocarbonyloxy)-ethyl-N-ethyl-3-chloroaniline | yellowish-tinged red |
| N-β-(p-Chlorobenzyloxy)-ethyl-N-ethyl-3-chloroaniline | somewhat yellowish-tinged red |
| N-β-(p-Chlorobenzoyloxy)-ethyl-N-ethyl-3-chloroaniline | somewhat yellowish-tinged red |
| N-β-(2,5-Dichlorophenoxy-ethyl-N-ethyl-3-chloroaniline | " |
| N-β-(m-Chlorophenoxy)-ethyl-N-ethyl-3-chloroaniline | " |
| N-β-(α'-Naphthoxy)-ethyl-N-ethyl-3-chloroaniline | red |
| N-β-(Phenylaminocarbonyloxy)-ethyl-N-ethyl-3-methoxyaniline | yellowish-tinged red |
| N-β-(p-Chlorobenzyloxy)-ethyl-N-ethyl-3-methoxyaniline | " |
| N-β-(p-Chlorobenzoyloxy)-ethyl-N-ethyl-3-methoxyaniline | " |
| N-β-(m-Chlorophenoxy)-ethyl-N-ethyl-3-methoxyaniline | " |
| N-β-(2,5-Dichlorophenoxy)-ethyl-N-ethyl-3-methoxyaniline | " |
| N-β-(2,4,5-Trichlorophenoxy)-ethyl-N-ethyl-3-methoxyaniline | " |
| N-β-(Phenylaminocarbonyloxy)-ethyl-N-ethyl-m-toluidine | red |
| N-β-(2,5-Dichlorophenoxy)-ethyl-N-ethyl-m-toluidine | " |
| N-β-(m-Chlorophenoxy)-ethyl-N-ethyl-m-toluidine | " |
| N-β-(α'-Naphthoxy)-ethyl-N-ethyl-m-toluidine | bluish-tinged red |
| N-β-Phenylaminocarbonyloxyethyl-tetrahydroquinoline | " |
| N-β-Phenylaminocarbonyloxyethyl-2,2,4-trimethyl-tetrahydroquinoline | " |
| N-β-Phenylaminocarbonyloxyethyl-2-methylindoline | " |
| N-β-Phenylaminocarbonyloxyethyl-2,3,3-trimethylindoline | " |
| Mixture of | |
| N-β-phenoxyethyl-2,2,4-trimethyl-7-chloro-tetrahydroquinoline and | |
| N-β-phenoxyethyl-2,2,4-trimethyl-5-chloro-tetrahydroquinoline | red |
| Mixture of | |
| N-β-benzyloxyethyl-2,2,4-trimethyl-7-chloro-tetrahydroquinoline and | |
| N-β-benzoyloxyethyl-2,2,4-trimethyl-5-chloro-tetrahydroquinoline | " |
| N-β-Phenoxyethyl-tetrahydroquinoline | bluish-tinged red |
| N-β-Benxyloxyethyl-tetrahydroquinoline | " |
| N-β-Benzoyloxyethyl-tetrahydroquinoline | " |
| N-β-(2,4-Dichlorophenoxy)-ethyl-tetrahydroquinoline | " |
| N-β-(p-Phenylphenoxy)-ethyl-tetrahydroquinoline | " |
| N-β-(Phenoxyethyl-2,3,3-trimethylindoline | " |
| N-β-Benzyloxyethyl-2,3,3-trimethylindoline | " |
| N-β-Benzoyloxyethyl-2,3,3-trimethylindoline | " |
| N-β-(p-Phenylphenoxy)-ethyl-2,3,3-trimethylindoline | " |
| N-β-(2,4-Dichlorophenoxy)-ethyl-2,3,3-trimethylindoline | " |
| N-β-Cyclohexyloxyethyl-tetrahydroquinoline | strongly bluish-tinged red |
| Mixture of | |
| N-β-cyclohexyloxyethyl-2,2,4-trimethyl-7-chloro-tetrahydroquinoline and | |
| N-β-cyclohexyloxyethyl-2,2,4-trimethyl-5-chloro-tetrahydroquinoline | red |
| N-β-(2,4-Dichlorophenoxy)-ethyl-N-methyl-3-chloroaniline | yellowish-tinged red |
| N-β-Phenoxyethyl-N-n-butyl-3-chloroaniline | red |
| N-β-Benzyloxyethyl-N-n-butyl-3-chloroaniline | " |
| N-β-Phenoxyethyl-N-methyl-3-chloroaniline | " |
| N-β-Benzyloxyethyl-N-methyl-3-chloroaniline | " |
| N-β-Phenylaminocarbonylethyl-4-methyl-3-chloroaniline | somewhat yellowish-tinged red |
| N-β-Phenylaminocarbonyloxyethyl-N-n-butyl-3-chloroaniline | red |
| N-β-Benzoyloxyethyl-N-methyl-3-chloroaniline | somewhat yellowish-tinged red |
| N-β-(2,4,5-Trichlorophenoxy)-ethyl-N-methyl-3-chloroaniline | " |
| N-β-Benzoyloxyethyl-N-n-butyl-3-chloroaniline | red |
| N-β-(2,4-Dichlorophenoxy)-ethyl-N-n-propyl-3-chloroaniline | " |
| N-β-Phenoxyethyl-N-ethyl-2-methylaniline | bluish-tinged red |
| N-β-Phenoxyethyl-N-ethyl-2-methoxyaniline | strongly bluish-tinged red |
| N-β-Phenoxyethyl-N-ethyl-3-acetylaminoaniline | red |
| N-β-Phenoxyethyl-N-ethyl-2-acetylaminoaniline | strongly bluish-tinged red |
| N-β-Phenoxyethyl-N-ethyl-3-ethoxyaniline | yellowish-tinged red |
| N-β-Phenoxyethyl-N-ethyl-2-phenoxyaniline | bluish-tinged red |
| N-β-Phenoxyethyl-N-ethyl-2-benzyloxyaniline | " |
| N-β-Phenoxyethyl-N-ethyl-3-benzyloxyaniline | red |
| N-β-(o-Phenylphenoxy)-ethyl-N-ethyl-3-chloroaniline | " |
| N-β-(o-Phenylphenoxy)-ethyl-N-methylaniline | " |
| N-β-(o-Phenylphenoxy)-ethyl-N-butylaniline | " |
| N-β-(2,4,5-Trichlorophenoxy)-ethyl-N-ethyl-m-toluidine | " |
| Mixture of | |
| N-β-phenoxyethyl-2,3,3-trimethyl-6-chloroindoline and | |
| N-β-phenoxyethyl-2,3,3-trimethyl-4-chloroindoline | " |
| N-β-Phenoxyethyl-N-ethyl-2-methyl-5-chloroaniline | " |
| N-β-Benzoyloxyethyl-N-ethyl-3-trifluoromethylaniline | " |
| N-β-Phenylaminocarbonyloxyethyl-N-ethyl-3-trifluoromethylaniline | " |
| N-β-Phenoxyethyl-N-ethyl-2,3-dimethylaniline | bluish-tinged red |
| N-β-Phenoxyethyl-N-ethyl-α-naphthylamine | " |
| N-β-Benzyloxyethyl-N-ethyl-α-naphthylamine | " |
| N-β-Benzoyloxyethyl-N-ethyl-α-naphthylamine | " |
| N-β-Phenylaminocarbonyloxyethyl-N-ethyl-α-naphthylamine | " |
| N-β-Phenoxyethyl-N-ethyl-2-methoxy-5-chloroaniline | red |
| N-β-Phenoxyethyl-N-ethyl-2-phenoxy-5-chloroaniline | " |
| N-β-Phenoxyethyl-N-ethyl-2-methyl-5-methoxyaniline | " |
| N-β-Phenoxyethyl-N-ethyl-2,5-dimethoxyaniline | bluish-tinged red |

Table-continued

| Coupling component | Colour shade on PAC |
|---|---|
| N-β-Phenoxyethyl-N-ethyl-2-methoxy-5-ethyl-sulphonylaniline | red |
| N-β-Phenoxyethyl-2,2,4-trimethyl-8-methoxy-tetrahydroquinoline | strongly bluish-tinged red |
| N-γ-Benzyloxypropylaniline | red |
| N-δ-Benzyloxy-n-butylaniline | " |
| N-γ-(β'-Phenoxyethyloxy)-propylaniline | " |
| N-δ-(β'-Phenoxyethyloxy)-butylaniline | " |

EXAMPLE 3

The procedure described in Example 2 is followed, but instead of dimethyl sulphate the equivalent amount of diethyl sulphate is used, and the reaction temperature is raised to 70° C. The dyestuff mixture of the formula

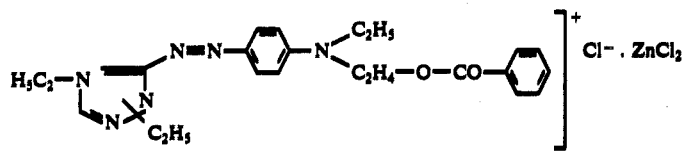

is obtained. This gives clear red dyeings, distinguished by good fastness properties, on fibre materials consisting of polyacrylonitrile.

If, when preparing the dyestuffs mentioned in the table accompanying Example 2, diethyl sulphate is used instead of dimethyl sulphate under the conditions indicated above, equivalent dyestuffs are obtained.

EXAMPLE 4

8 parts of the azo dyestuff prepared according to Example 1(a) and subsequently dried, are stirred with 15 parts of acetonitrile and 15 parts of n-butyl bromide, 0.5 part of magnesium oxide is added and the mixture is heated to 80° C for 12 hours. The solvents are then distilled off at 15 mm Hg. The distillation residue is dissolved in 200 parts of boiling water. After clarifying the solution with 2 parts of active charcoal, the dyestuff is precipitated by adding 20 parts of sodium chloride and 10 parts of zinc chloride to the solution.

The dyestuff has the formula

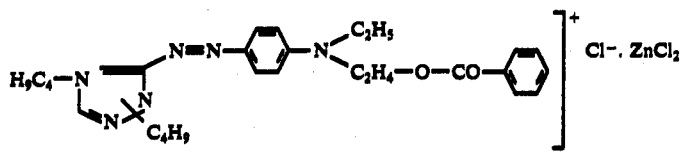

and dyes fibre materials consisting of polyacrylonitrile in a clear red colour shade.

EXAMPLE 5

The procedure described in Example 4 is followed, but the butyl bromide is replaced by the equivalent amount of benzyl bromide. The dyestuff of the formula

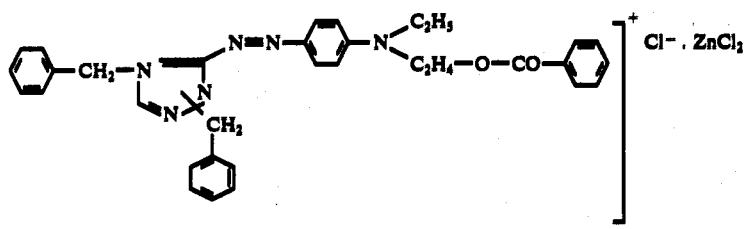

is obtained. It dyes fibre materials consisting of polyacrylonitrile in a bluish-tinged red colour shade.

EXAMPLE 6

20 parts of the azo dyestuff prepared analogously to the coupling instruction indicated in Example 1(a) from 3-amino-(1,2,4)-triazole and N-β-(p-phenylphenoxy)-ethyl-N-ethylaniline are stirred in 60 parts of glacial acetic acid at 50° C. Ethylene oxide is then passed in until no further azo dyestuff is detectable in the thin layer chromatogram. The cationic dyestuff obtained is caused to crystallise by diluting the reaction solution with 500 parts of saturated sodium chloride solution and is filtered off and dried. It has the formula

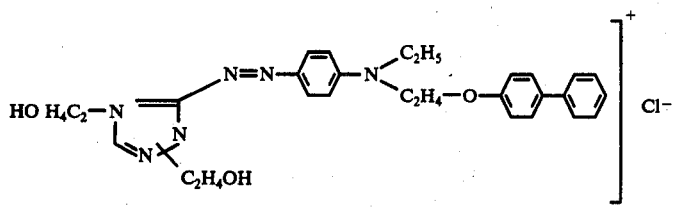

and dyes fibre materials consisting of polyacrylonitrile in a bluish-tinged red.

EXAMPLE 7

The procedure described in Example 6 is followed, but instead of introducing ethylene oxide, 15 parts of 1,2-butylene oxide are added dropwise at 80° C. The dyestuff of the formula

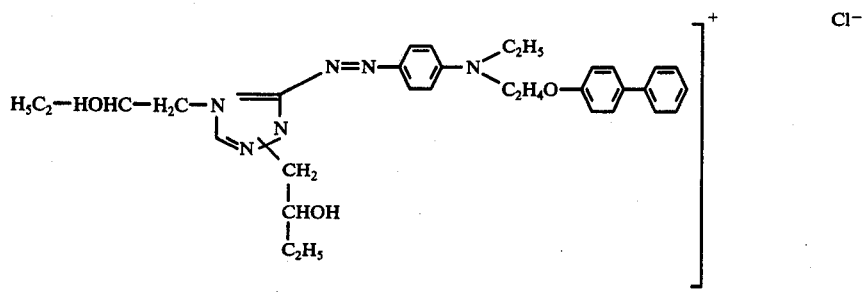

is obtained. It dyes fibre materials consisting of polyacrylonitrile in a bluish-tinged red.

If instead of butylene oxide the equivalent amount of γ-phenoxypropylene oxide was used, an equivalent dyestuff was obtained, which again dyes fibre materials consisting of polyacrylonitrile in a bluish-tinged red.

Equivalent red dyestuffs are also contained if in preparing the dyestuffs listed in Example 2 or in the table accompanying Example 2, the quaternisation is not carried out with dimethyl sulphate as indicated there, but is carried out in the manner described in Examples 6 and 7, with ethylene oxide, propylene oxide, butylene oxide, γ-phenoxypropylene oxide, styrene oxide, γ-ethoxypropylene oxide, γ-propoxypropylene oxide, epichlorohydrin, γ-methoxypropylene oxide, γ-butoxypropylene oxide or other epoxides.

EXAMPLE 8

10.3 parts of the non-quaternised azo dyestuff described in Example 6 are stirred with 35.5 parts of acrylic acid amide and 90 parts of glacial acetic acid, 5 parts of 36% strength hydrochloric acid are added to the mixture and the solution is heated to 90° C for 1 hour. It is then stirred into 1,000 parts of saturated sodium chloride solution and 30 parts of zinc chloride are added. The dyestuff is separated from the aqueous phase and dissolved in 20 parts of boiling water. After clarifying the solution with 8 parts of active charcoal, the dyestuff is precipitated by adding 40 parts of sodium chloride. It has the formula

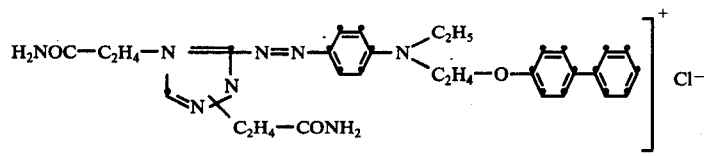

and dyes fibre materials consisting of polyacrylonitrile in a clear red.

If instead of acrylic acid amide an equivalent amount of acrylic acid was used, an equivalent red dyestuff of the formula

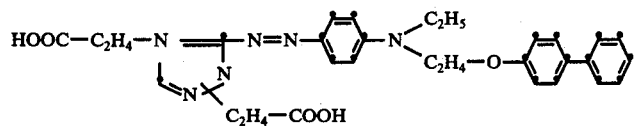

was obtained.

Equivalent red dyestuffs are also obtained if, when preparing the dyestuffs listed in Example 2 or in the table accompanying Example 2, the quaternisation is not carried out with dimethyl sulphate, as stated there, but is carried out with acrylic acid amide or acrylic acid, as described above.

EXAMPLE 9

A fabric consisting of polyacrylonitrile is printed with a printing paste which was prepared as follows: 30 parts of the dyestuff described in Example 1, 50 parts of thiodiethylene glycol, 30 parts of cyclohexanol and 30 parts of 30% strength acetic acid are covered with 330 parts of hot water and the resulting solution is added to 500 parts of crystal gum (gum arabic as thickener). Finally, 30 parts of zinc nitrate solution are also added.

The resulting print is dried, steamed for 30 minutes and then rinsed. A red print with very good fastness properties is obtained.

EXAMPLE 10

Acid-modified polyglycol terephthalate fibres are introduced, using a liquor ratio of 1:40, into an aqueous bath at 20° C which contains, per liter, 3 to 10 g of sodium sulphate, 0.1 to 1 g of oleyl alcohol polyglycol ether (from 1 mol of oleyl alcohol and 50 mols of ethylene oxide), 0 to 15 g of dimethylbenzyldodecylammonium chloride and 0.15 g of the dyestuff described in 10th place in the table accompanying Example 2, and which was adjusted to pH 4 to 5 with acetic acid. The bath is heated to 100° C over the course of 30 minutes and is kept at this temperature for 60 minutes. The fibres are then rinsed and dried. A red dyeing of very good fastness properties is obtained.

EXAMPLE 11

Polyacrylonitrile fibres are introduced, using a liquor ratio of 1:40, into an aqueous bath at 40° C which contains, per liter, 0.75 g of 30% strength acetic acid, 0.38 g of sodium acetate and 0.15 g of the dyestuff described in Example 1. The bath is heated to the boil over the course of 20 to 30 minutes and is kept at this temperature for 30 to 60 minutes. After rinsing and drying, a red dyeing with very good fastness properties is obtained.

EXAMPLE 12

A stock solution is prepared from 15 parts of the dyestuff mentioned in Example 1, 15 parts of plyacrylonitrile and 70 parts of dimethylformamide and is added to a customary polyacrylonitrile spinning solution, and the mixture is spun in the known manner. A red dyeing of very good fastness properties is obtained.

EXAMPLE 13

Acid-modified synthetic polyamide fibres are introduced, using a liquor ratio of 1:40, into an aqueous bath which contains, per liter, 10 g of sodium acetate, 1 to 5 g of oleyl alcohol polyglycol ether (prepared from 1 mol of oleyl alcohol and 50 mols of ethylene oxide) and 0.3 g of the dyestuff described in Example 1, and which was adjusted to pH 4 to 5 with acetic acid. The bath is heated to 98° C over the course of 30 minutes and is kept at this temperature. The fibres are then rinsed and dried. A red dyeing is obtained.

We claim:
1. Cationic dyestuff of the formula

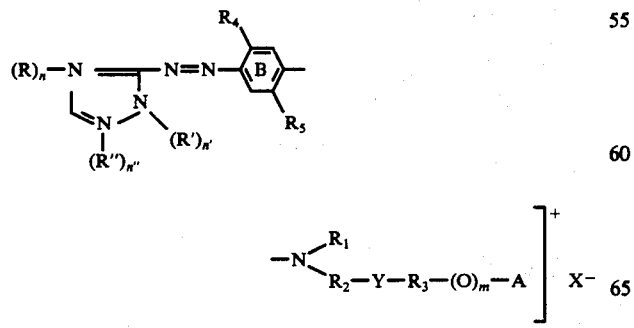

wherein $R$, $R'$, $R''$, and $R_1$ independently of one another are $C_1$-$C_6$ alkyl unsubstituted or substituted with carboxyl, halogen, hydroxyl, $C_1$-$C_4$ alkoxy, cyano, $C_1$-$C_4$ alkoxy carbonyl, or carbonamide; cyclopentyl unsubstituted or substituted with halogen or $C_1$-$C_6$ alkyl; cyclohexyl, unsubstituted or substituted with halogen or $C_1$-$C_6$ alkyl; benzyl unsubstituted or substituted with halogen or $C_1$-$C_4$ alkyl; 2-phenyl ethyl unsubstituted or substituted in the phenyl nucleus with halogen or $C_1$-$C_4$ alkyl; β-phenyl-β-hydroxyethyl unsubstituted or substituted in the phenyl nucleus with halogen or $C_1$-$C_4$ alkyl; 2-phenylpropyl-(2) unsubstituted or substituted in the phenyl nucleus with halogen or $C_1$-$C_4$ alkyl; or $R_1$ is cyclised onto ring B to form pyrroline or tetrahydropyridine, each of which is unsubstituted or substituted with one or more $C_1$-$C_4$-alkyl radicals;

$R_2$ is

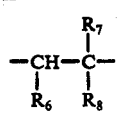

$R_6$ is hydrogen, methyl, ethyl, methoxymethyl, ethoxymethyl, propoxymethyl, butoxymethyl, allyloxymethyl, phenyl, or phenoxymethyl;

$R_7$ is hydrogen, methyl, ethyl, methoxymethyl, ethoxymethyl, propoxymethyl, butoxymethyl, allyloxymethyl, phenyl, phenoxymethyl, —Y—A [—O—$(CH_2)_q$—$(O)_m$—A] or chloromethyl, with the proviso that $R_7$ is [—Y—A] only when [—Y—$R_3$—$(O)_m$—A] is [—Y—A];

that $R_7$ is [—O—$(CH_2)_q$—$(O)_m$—A], only when [—Y—$R_3$—$(O)_m$—A] is [—O—$(CH_2)_q$—$(O)_m$—A];

$q$ is a number from 1 to 4;

$R_8$ is hydrogen or methyl;

$p$ is a number from 1 to 6;

Y is oxygen or sulfur;

$R_3$ is a direct bond or $C_1$-$C_6$ alkylene, —CO—, or —CONH—;

$R_4$ is hydrogen, halogen, $C_1$-$C_6$-alkyl, $C_1$-$C_6$ alkoxy, cyano, trifluoromethyl, phenoxy, benzyloxy, acetylamino, propionylamino, benzoylamino, methylsulfonylamino, ethylsulfonylamino, phenylsulfonylamino, $C_1$-$C_4$ alkylcarbonyloxy, benzoyloxy, or $C_1$-$C_4$ alkylsulfonyl;

$R_5$ is hydrogen, $C_1$-$C_6$ alkyl, $C_1$-$C_6$ alkoxy, phenoxy, benzyloxy, acetylamino, propionylamino, benzoylamino, methylsulfonylamino, ethylsulfonylamino, phenyl sulfonylamino, $C_1$-$C_4$ alkyl carbonyloxy, benzoyloxy, or $C_1$-$C_4$ alkylsulfonyl;

A is cyclohexyl, methyl, borneyl, tetrahydronaphthyl, decahydronaphthyl, phenyl, naphthyl, 1,2,4-triazolyl-(3), benzthiazolyl-(2) or benzoxazolyl-(2), each of which are unsubstituted or substituted with $C_1$-$C_{12}$ alkyl, $C_1$-$C_6$ alkoxy, halogen, $C_1$-$C_4$ alkoxycarbonyl, phenyl, benzyl, 2-phenylethyl, 2-phenylpropyl, $C_1$-$C_4$-alkylsulfonyl, or phenylsulphonyl;

$X^-$ is an anion;

$n$, $n'$, and $n''$ independently of one another are 0 or 1;

$m$ is 0 or 1, with the proviso that the sum $n+n'+n''=2$ and that $m$ is 1 only if $R_3$ is alkylene.

2. The dyestuff of claim 1 wherein —Y—$R_3$—$(O)_m$— is —S—, —O—($C_1$-$C_6$ alkylene)—O—, —OCO—, —O—CO—NH—, —S—($C_1$-$C_6$ alkylene)—O—, or —O—($C_1$-$C_{C6}$ alkylene)—.

3. The dyestuff of claim 1 wherein $R_2$ is —$(CH_2)$—$_p$.
4. The dyestuff of claim 3 wherein
$R_1$, $R'$ and $R''$ are independently of one another methyl, ethyl, or benzyl;
$R_4$ is hydrogen, $C_1$-$C_4$ alkyl, $C_1$-$C_4$ alkoxy, chlorine, or bromine; and
$p$ is a number from 2 to 4.
5. The dyestuff of claim 1 wherein [—Y—$R_3$—(O)-$_m$—A] is [—Y—A].
6. Dyestuff of claim 5 wherein
R, $R'$ and $R''$ independently of one another are methyl, ethyl, or benzyl;
$R_4$ is hydrogen, $C_1$-$C_4$ alkyl, $C_1$-$C_4$ alkoxy, chlorine, or bromine;
$R_5$ is hydrogen;
$R_2$ is —$(CH_2)_p$—;
$p$ is a number from 2 to 4;
Y is oxygen;
A is cyclohexyl or phenyl or naphthyl unsubstituted or substituted with $C_1$-$C_{12}$ alkyl, $C_1$-$C_6$ alkoxy, halogen, $C_1$-$C_4$ alkoxycarbonyl, phenyl, benzyl, 2-phenylethyl, 2-phenylpropyl, $C_1$-$C_4$-alkylsulfonyl, or phenylsulfonyl.
7. Dyestuff of claim 4 wherein
R, $R'$ and $R''$ are each methyl;
$R_4$ is hydrogen, methyl, methoxy, or chlorine;
$p$ is 2, Y is oxygen; and
A is cyclohexyl or phenyl or naphthyl unsubstituted or substituted with $C_1$-$C_{12}$ alkyl, $C_1$-$C_6$ alkoxy, halogen, $C_1$-$C_4$ alkoxycarbonyl, phenyl, benzyl, 2-phenylethyl, 2-phenylpropyl, $C_1$-$C_4$ alkylsulfonyl, or phenylsulfonyl.
8. Dyestuff of claim 1 wherein
[Y—$R_3$—(O)$_m$—A] is [—O—$(CH_2)_q$—(O)$_m$—A]; and
$q$ is a number from 1 to 4.
9. Dyestuff of claim 8 wherein
R, $R'$ and $R''$ are methyl, ethyl or benzyl;
$R_5$ is hydrogen;
$R_4$ is hydrogen, $C_1$-$C_4$ alkyl, $C_1$-$C_4$ alkoxy, chlorine or bromine,
$R_2$ is —$(CH_2)_p$—; and
$p$ is a number from 2 to 4.
10. Dyestuff of claim 8 wherein
R, $R'$ and $R''$ are methyl;
$R_4$ is hydrogen, methoxy, chlorine or methyl;
$p$ is 2;
$q$ is 2;
$m$ is 1; and
A is phenyl or naphthyl unsubstituted or substituted with $C_1$-$C_{12}$ alkyl, $C_1$-$C_6$ alkoxy, halogen, $C_1$-$C_4$ alkxoycarbonyl, phenyl, benzyl, 2-phenylethyl, 2-phenylpropyl, $C_1$-$C_4$ alkylsulfonyl, or phenylsulfonyl.
11. Dyestuff of claim 8 wherein
R, $R'$ and $R''$ are methyl;
$R_4$ is hydrogen, methoxy, chlorine or methyl;
$p$ is 2;
$m$ is 0; and
A is phenyl or naphthyl unsubstituted or substituted with $C_1$-$C_{12}$ alkyl, $C_1$-$C_6$ alkoxy, halogen, $C_1$-$C_4$ alkoxycarbonyl, phenyl, benzyl, 2-phenylethyl, 2-phenylpropyl, $C_1$-$C_4$ alkylsulfonyl, or phenylsulfonyl.
12. The dyestuff of claim 1 wherein [—Y—$R_3$—(O)-$_m$—A] is [—O—CO—A].
13. The dyestuff of claim 12 wherein
R, $R'$ and $R''$ are methyl;
$R_4$ is hydrogen, methoxy, chlorine, or methyl;
$p$ is 2; and
A is phenyl or naphthyl each of which is unsubstituted or substituted with $C_1$-$C_{12}$ alkyl, $C_1$-$C_6$ alkoxy, halogen, $C_1$-$C_4$ alkoxycarbonyl, phenyl, benzyl, 2-phenylethyl, 2-phenylpropyl, $C_1$-$C_4$ alkylsulfonyl or phenylsulfonyl.
14. The dyestuff of claim 12 wherein
R, $R'$ and $R''$ independently of one another are methyl, ethyl or benzyl;
$R_5$ is hydrogen;
$R_4$ is hydrogen, $C_1$-$C_4$-alkyl, $C_1$-$C_4$-alkoxy, chlorine or bromine;
$R_2$ is —$(CH_2)_p$—; and
$p$ is 2, 3 or 4.
15. The dyestuff of claim 1 wherein
[—Y—$R_3$—(O)$_m$—A] is [—O—CO—NH—A]; and
A is phenyl or naphthyl each of which is unsubstituted or substituted with $C_1$-$C_{12}$ alkyl, $C_1$-$C_6$ alkoxy, halogen, $C_1$-$C_4$ alkoxycarbonyl, phenyl, benzyl, 2-phenylethyl, 2-phenylpropyl, $C_1$-$C_4$ alkylsulfonyl or phenylsulfonyl.
16. The dyestuff of claim 15 wherein
R, $R'$ and $R''$ are methyl;
$R_4$ is hydrogen, methoxy, chlorine, or methyl; and
$p$ is 2.
17. The dyestuff of claim 1 wherein [—Y—$R_3$—(O)-$_m$—] is —S—, —O—($C_1$-$C_6$-alkylene)—O—, —S—($C_1$-$C_6$-alkylene)—O—, or [—O—($C_1$-$C_6$-alkylene—].
18. Cationic dyestuff according to claim 1 of the formula

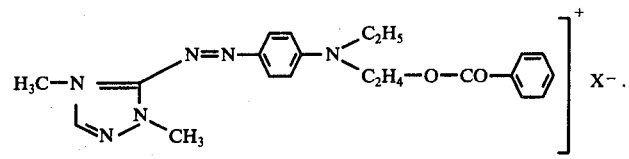

A is phenyl or naphthyl unsubstituted or substituted with $C_1$-$C_{12}$ alkyl, $C_1$-$C_6$ alkoxy, halogen, $C_1$-$C_4$ 19. Cationic dyestuff according to claim 1 of the formula

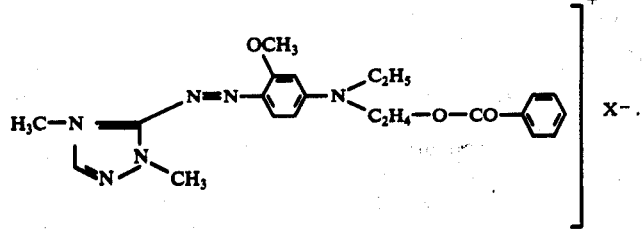
20. Cationic dyestuff according to claim 1 of the formula
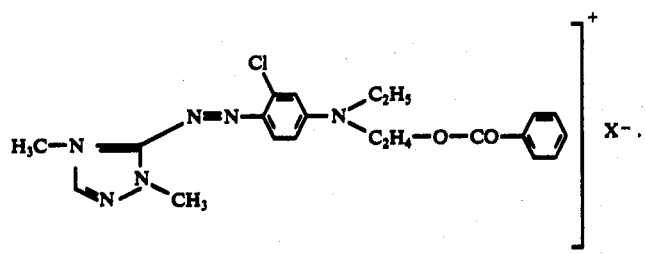
21. Cationic dyestuff according to claim 1 of the formula
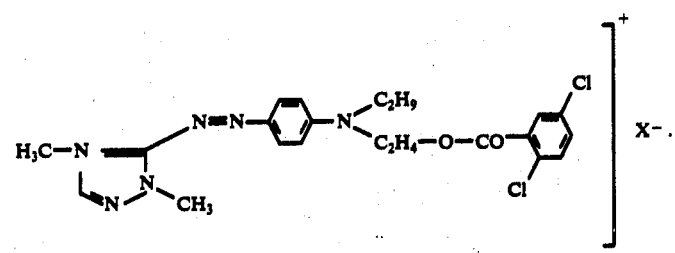
22. Cationic dyestuff according to claim 1 of the formula
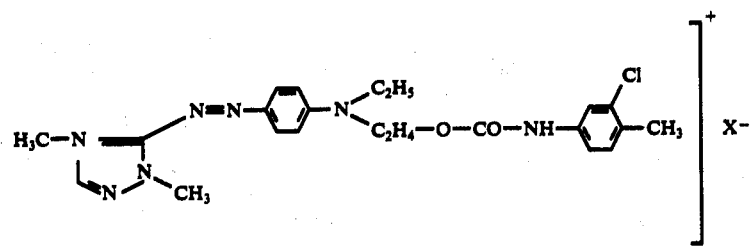
* * * * *